US009305165B2

(12) United States Patent
Snow et al.

(10) Patent No.: US 9,305,165 B2
(45) Date of Patent: Apr. 5, 2016

(54) METHODS, SYSTEMS, AND COMPUTER READABLE MEDIA FOR DETECTING INJECTED MACHINE CODE

(75) Inventors: Kevin Snow, Cary, NC (US); Fabian Monrose, Chapel Hill, NC (US); Srinivas Krishnan, Carrboro, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 83 days.

(21) Appl. No.: 14/115,096

(22) PCT Filed: May 7, 2012

(86) PCT No.: PCT/US2012/036760
§ 371 (c)(1),
(2), (4) Date: Feb. 11, 2014

(87) PCT Pub. No.: WO2012/154664
PCT Pub. Date: Nov. 15, 2012

(65) Prior Publication Data
US 2014/0181976 A1    Jun. 26, 2014

Related U.S. Application Data

(60) Provisional application No. 61/483,613, filed on May 6, 2011.

(51) Int. Cl.
*G06F 11/00* (2006.01)
*G06F 21/55* (2013.01)
*G06F 21/53* (2013.01)
*G06F 21/56* (2013.01)

(52) U.S. Cl.
CPC .............. *G06F 21/554* (2013.01); *G06F 21/53* (2013.01); *G06F 21/566* (2013.01)

(58) Field of Classification Search
CPC ................... H04L 63/1416; H04L 63/1408
USPC .................................................. 726/22–25
See application file for complete search history.

(56) References Cited

U.S. PATENT DOCUMENTS

| 7,971,255 | B1 * | 6/2011 | Kc et al. ......................... 726/24 |
| 8,239,836 | B1 * | 8/2012 | Franz et al. ................... 717/127 |
| 8,924,782 | B2 * | 12/2014 | Locasto et al. ................. 714/15 |
| 2008/0034429 | A1 | 2/2008 | Schneider |

(Continued)

OTHER PUBLICATIONS

E. Buchanan, R. Roemer, H. Shacham, and S. Savage, "When Good Instructions Go Bad: Generalizing Return-Oriented Programming to RISC", In ACM Conference on Computer and Communications Security, pp. 27-38, (Oct. 2008).

(Continued)

*Primary Examiner* — Anthony Brown
(74) *Attorney, Agent, or Firm* — Jenkins, Wilson, Taylor & Hunt, P.A.

(57) ABSTRACT

According to one aspect, the subject matter described herein includes a method for detecting injected machine code. The method includes extracting data content from a buffer. The method also includes providing an operating system kernel configured to detect injected machine code. The method further includes executing, using the operating system kernel, the data content on a physical processor. The method further includes monitoring, using the operating system kernel, the execution of the data content to determine whether the data content contains injected machine code indicative of a code injection attack.

23 Claims, 12 Drawing Sheets

(56) References Cited

U.S. PATENT DOCUMENTS

| | | | |
|---|---|---|---|
| 2008/0040800 A1* | 2/2008 | Park | 726/22 |
| 2009/0089497 A1 | 4/2009 | Bulygin et al. | |
| 2010/0146615 A1* | 6/2010 | Locasto et al. | 726/11 |
| 2010/0281273 A1 | 11/2010 | Lee et al. | |
| 2011/0179490 A1* | 7/2011 | Jin et al. | 726/24 |

OTHER PUBLICATIONS

B. Z. Charles Curtsigner, Benjamin Livshits and C. Seifert, "Zozzle: Low-overhead Mostly Static Javascript Malware Detection," Microsoft Technical Report (MSR-TR-2010-156), (Nov. 2010).
S. P. Chung & A. K. Mok, "Swarm Attacks against Network-level Emulation/Analysis," In International symposium on Recent Advances in Intrusion Detection, pp. 1-17, (2008).
M. Cova, C. Kruegel, and V. Giovanni, "Detection and Analysis of Drive-by-Download Attacks and Malicious JavaScript Code," In International conference on World Wide Web, pp. 281-290, 2010.
Y. Ding, T. Wei, T. Wang, Z. Liang, and W. Zou, "Heap Taichi: Exploiting Memory Allocation Granularity in Heap-Spraying Attacks," In Annual Computer Security Applications Conference, pp. 327-336, (2010).
M. Egele, P. Wurzinger, C. Kruegel, and E. Kirda, "Defending Browsers against Drive-by Downloads: Mitigating Heap-spraying Code Injection Attacks," In Detection of Intrusions and Malware & Vulnerability Assessment, (Jun. 2009).
P. Fogla, M. Sharif, R. Perdisci, O. Kolesnikov, and W. Lee, "Polymorphic Blending Attacks," In USENIX Security Symposium, pp. 241-256, (2006).
S. Ford, M. Cova, C. Kruegel, and G. Vigna, "Analyzing and Detecting Malicious Flash Advertisements," In Computer Security Applications Conference, pp. 363-372, (2009).
D. A. Glynos, "Context-keyed Payload Encoding: Fighting the Next Generation of IDS," In Athens IT Security Conference (ATH.C0N), (2010).
R. Goldberg, "Survey of Virtual Machine Research," IEEE Computer Magazine, 7(6):34-45, (Jun. 1974).
B. Gu, X. Bai Z. Yang, A. C. Champion, and D. Xuan, "Malicious Shellcode Detection with Virtual Memory Snapshots," In International Conference on Computer Communications (INFOCOM), pp. 974-982, (2010).
I. Kim, K. Kang, Y. Choi, D. Kim, J. Oh, and K. Han, "A Practical Approach for Detecting Executable Codes in Network Traffic," In Asia-Pacific Network Ops. & Mngt Symposium, pp. 354-363 (2007).
G. MacManus and M. Sutton, "Punk Ode: Hiding Shellcode in Plain Sight," In Black Hat USA, (2006).
L. Martignoni, R. Paleari, G. F. Roglia, and D. Bruschi, "Testing CPU Emulators," In International Symposium on Software Testing and Analysis, pp. 261-272, (2009).
J. Mason, S. Small, F. Monrose, and G. MacManus, "English Shellcode," In Conference on Computer and Communications Security, pp. 524-533, (2009).
J. McHugh, "Testing Intrusion Detection Systems: A Critique of the 1998 and 1999 DARPA Intrusion Detection System Evaluations as Performed by Lincoln Laboratory," ACM Transactions on Information and Systems Security, vol. 3, No. 4, pp. 262-294, (Nov. 2000).
R. Paleari, L. Martignoni, G. F. Roglia, and D. Bruschi, "A Fistful of Red-Pills: How to Automatically Generate Procedures to Detect CPU Emulators," In 3rd USENIX Workshop on Offensive Technologies, (2009).
A. Pasupulati, J. Coit, K. Levitt, S. F. Wu, S. H. Li, R. C. Kuo, and K. P. Fan, "Buttercup: On Network-based Detection of Polymorphic Buffer Overflow Vulnerabilities," In IEEE/IFIP Network Op. & Mngt Symposium, pp. 1-14, (May 2004).
U. Payer, P. Teufl, and M. Lamberger, "Hybrid Engine for Polymorphic Shellcode Detection," In Detection of Intrusions and Malware & Vulnerability Assessment, (2005).
J. D. Pincus and B. Baker, "Beyond Stack Smashing: Recent Advances in Exploiting Buffer Overruns," IEEE Security and Privacy, (2004).
M. Polychronakis, K. G. Anagnostakis, and E. P. Markatos, "Network-Level Polymorphic Shellcode Detection Using Emulation," In Detection of Intrusions and Malware & Vulnerability Assessment, pp. 54-73, (2006).
M. Polychronakis, K. G. Anagnostakis, and E. P. Markatos, "Emulation-based Detection of Non-self-contained Polymorphic Shellcode," In International Symposium on Recent Advances in Intrusion Detection, (2007).
M. Polychronakis, K. G. Anagnostakis, and E. P. Markatos, "An Empirical Study of Real-world Polymorphic Code Injection Attacks," In USENIX Workshop on Large-Scale Exploits and Emergent Threats, (2009).
M. Polychronakis, K. G. Anagnostakis, and E. P. Markatos, "Comprehensive Shellcode Detection using Runtime Heuristics," In Annual Computer Security Applications Conference, pp. 287-296, (Dec. 2010).
P. V. Prahbu, Y. Song, and S. J. Stolfo, "Smashing the Stack with Hydra: The Many Heads of Advanced Polymorphic Shellcode," Presented at Defcon 17, Las Vegas, pp. 1-20 (2009).
N. Provos, D. McNamee, P. Mavrommatis, K. Wang, and N. Modadugu, "The Ghost in the Browser: Analysis of Web-based Malware," In USENIX Workshop on Hot Topics in Botnets, (2007).
N. Provos, P. Mavrommatis, M. A. Rajab, and F. Monrose, "All Your iFRAMEs Point to Us," In USENIX Security Symposium, (2008).
T. Raffetseder, C. Kruegel, and E. Kirda, "Detecting System Emulators," Information Security, 4779:1-18, (2007).
P. Ratanaworabhan, B. Livshits, and B. Zorn, "NOZZLE: A Defense Against Heap-spraying Code Injection Attacks," In USENIX Security Symposium, pp. 169-186, (2009).
A. Sotirov & M. Dowd, Bypassing Browser Memory Protections, Setting back browser security by 10 years, In Black Hat USA, (2008).
T. Toth & C. Kruegel, "Accurate Buffer Overflow Detection via Abstract Payload Execution," In International Symposium on Recent Advances in Intrusion Detection, pp. 274-291, (2002).
X. Wang, Y.-C. Jhi, S. Zhu, and P. Liu, "STILL: Exploit Code Detection via Static Taint and Initialization Analyses," Annual Computer Security Applications Conference, pp. 289-298, (Dec. 2008).
Y. Younan, P. Philippaerts, F. Piessens, W. Joosen, S. Lachmund, and T. Walter, "Filter-resistant Code Injection on ARM," In ACM Conference on Computer and Communications Security, pp. 1-10, (2009).
Q. Zhang, D. S. Reeves, P. Ning, and S. P. Iyer, "Analyzing Network Traffic to Detect Self-Decrypting Exploit Code," In ACM Symposium on Information, Computer and Communications Security, (2007).
L. Ballard, F. Monrose, and D. Lopresti, "Biometric Authentication Revisited: Understanding the Impact of Wolves in Sheep's Clothing," In Proceedings of the 15th Annual USENIX Security Symposium, pp. 29-41, (Aug. 2006).
S. Coull, F. Monrose, M. Reiter, and M. Bailey, "The Challenges of Effectively Anonymizing Network Data," In Cybersecurity Applications and Technology Conference for Homeland Security, pp. 230-236, (2009).
S. E. Coull, M. P. Collins, C. V. Wright, F. Monrose, and M. K. Reiter, "On Web Browsing Privacy in Anonymized NetFlows," In Proceedings of the 16th USENIX Security Symposium, (Aug. 2007).
S. E. Coull, C. Wright, F. Monrose, M. Collins, and M. K. Reiter, "Playing Devil's Advocate: Inferring Sensitive Information from Anonymized Network Traces," In Proceedings of the 14th Annual Network and Distributed System Security Symposium, (Feb. 2007).
DHS. PREDICT: Protected Repository for the Defense of Infrastructure Against Cyber Threats, (2007). See http://www.predict.org.
M. Foukarakis, D. Antoniades, and M. Polychronakis, "Deep Packet Anonymization," In European Workshop on System Security, pp. 16-21, (Mar. 2009).
T. Gamer, C. Mayer, and M. Scholler, "PktAnon: A Generic Framework for Profile-based Traffic Anonymization," PIK Praxis der Informationsverarbeitung und Kommunikation, 2:76-81, (2008).
R. Greer, "Daytona and the Fourth-Generation Language Cymbal," In Proceedings of the 1999 ACM SIGMOD International Conference on Management of Data, pp. 525-526, (1999).
P. Gutmann, "The Commercial Malware Industry," Presented at Defcon 15, (2007).

(56) References Cited

OTHER PUBLICATIONS

M. Goebel et al., "A Survey of Data Mining and Knowledge Discovery Software Tools," International Knowledge Discovery and Data Mining Tools Competition. http://kdd.ics.uci.edu/databases/kddcup99/kddcup99.html, (1999).

O. Kolesnikov, D. Dagon, and W. Lee, "Advanced Polymorphic Worms: Evading IDS by Blending in with Normal Traffic," Technical Report GIT-CC-05-09, Georgia Institute of Technology, (2005).

S. Kornexl, V. Paxson, H. Dreger, A. Feldmann, and R. Sommer, "Building a Time Machine for Efficient Recording and Retrieval of High-Volume Network Traffic," In Proceedings of the 5th ACM SIGCOMM Conference on Internet Measurement, pp. 267-272, (2005).

S. Krishnan & F. Monrose, "Time Capsule: Secure Recording of Accesses to a Protected Datastore," In Proceedings of the 2nd ACM Workshop on Virtual Machine Security, pp. 23-31, (Nov. 2009).

S. Krishnan, K. Z. Snow, and F. Monrose, "Trail of Bytes: Efficient Support for Forensic Analysis," In ACM Conf. on Computer and Comm. Security, pp. 50-60, (2010).

G. Kuenning & E. L. Miller, "Anonymization Techniques for URLs and Filenames," TR UCSC-CRL-03-05, University of California at Santa Cruz, (Sep. 2003).

G. Neiger, F. Leung, D. Rodgers, A. Santoni, and R. Uhlig, "Intel Virtualization Technology: Hardware Support for Efficient Processor Virtualization," Intel Technology Journal, vol. 10, Issue 3, pp. 167-178, (2006).

Obscou, "Building IA32 Unicode-Proof Shellcodes," Phrack, 11(61), (Aug. 2003).

R. Pang, M. Allman, V. Paxson, and J. Lee, "The Devil and Packet Trace Anonymization," SIGCOMM Computer Communications Review, 36(1):29-38, (Jan. 2006).

M. A. Rajab, J. Zarfoss, F. Monrose, and A. Terzis, "A Multifaceted Approach to Understanding the Botnet Phenomenon," In Proceedings of ACM SIGCOMM/USENIX Internet Measurement Conference (IMC), pp. 41-52, (Oct. 2006).

Rix, "Writing IA32 Alphanumeric Shellcodes," Phrack, 11(57), (Aug. 2001).

A. Slagell, K. Lakkaraju, and K. Luo, "FLAIM: A Multi-level Anonymization Framework for Computer and Network Logs," In USENIX Large Installation System Administration Conference, pp. 63-77, (2006).

S. Small, J. Mason, F. Monrose, N. Provos, and A. Stubblefield, "To Catch a Predator: A Natural Language Approach for Eliciting Malicious Payloads," In USENIX Security Symposium, pp. 171-184, (2008).

Symantec White Paper, Symantec Report on Attack Kits and Malicious Websites, (Jul. 2010).

T. Wana, "Writing UTF-8 Shellcode," Phrack, 11(62), (Jul. 2004).

Y. Zhang, F. Monrose, and M. K. Reiter, "The Security of Modern Password Expiration: An Algorithmic Framework and Empirical Analysis," In Proceedings of the 17th ACM conference on Computer and communications security, pp. 176-186, ACM (2010).

K. Adams & O. Agesen, "A Comparison of Software and Hardware Techniques for x86 Virtualization," In Proceedings of the 12th International Conference on Architectural Support for Programming Languages and Operating Systems, pp. 2-13, New York, NY, USA (2006).

W. A. Arbaugh, D. J. Farber, J. M. Smith, "A Secure and Reliable Bootstrap Architecture," In Proceedings of the 1997 IEEE Symposium on Security and Privacy, pp. 65-71, (1997).

Paul Barham, Boris Dragovic, Keir Frase, Steven Hand, Tim Harris, Alex Ho, Rolf Neugebauer, Ian Pratt, Andrew Warfield, "Xen and the Art of Virtualization," In Proceedings of the 19th ACM Symposium on Operating Systems Principles, pp. 164-177, New York, NY, USA (2003).

Stefan Berger, Ramón Cáceres, Kenneth A. Goldman, Ronald Perez, Reiner Sailer, Leendert van Doorn, "vTPM: Virtualizing the Trusted Platform Module," In Proceedings of the 15th conference on USENIX Security Symposium, Berkely, CA, USA, pp. 305-320, (2006).

D. P. Berrange, "Taking Full Advantage of QEMU in the Xen Userspace," See http://people.redhat.com/berrange/xen-summit-2007-sj/xen-summit-xenite-report.pdf, (2007).

Peter M. Chen & Brian D. Noble, "When Virtual Is Better Than Real," In Proceedings of the 8th Workshop on Hot Topics in Operating Systems, p. 133-138, (May 2001).

Xiaoxin Chen, Tal Garfinkel, E. Christopher Lewis, Pratap Subrahmanyam, Carl A. Waldspurger, Dan Boneh, Jeffrey Dwoskin, Dan R.K. Ports, "Overshadow: A Virtualization-Based Approach to Retrofitting Protection in Commodity Operating Systems," In Proceedings of the 13th International Conference on Architectural Support for Programming Languages and Operating Systems, (May 2008).

George W. Dunlap, Samuel T. King, Sukru Cinar, Murtaza A. Basrai, Peter M. Chen, "ReVirt: Enabling Intrusion Analysis through Virtual-Machine Logging and Replay," In Proceedings of the 5th symposium on Operating Systems Design and Implementation, pp. 211-223, New York, NY, USA (2002).

J. Franklin, A. Perrig, V. Paxson, and S. Savage, "An Inquiry into the Nature and Causes of the Wealth of Internet Miscreants," In Proceedings of the 14th ACM conference on Computer and Communications Security, pp. 375-388, New York, NY, USA (2007).

Tal Garfinkel, Ben Pfaff, Jim Chow, Mendel Rosenblum, Dan Boneh, "Terra: A Virtual Machine-Based Platform for Trusted Computing," In Proceedings of the 19th ACM Symposium on Operating Systems Principles, pp. 193-206, (2003).

Ashvin Goel, Kenneth Po, Kamran Farhadi, Zheng Li, Eyal de Lara, "The Taser Intrusion Recovery System," In Proceedings of the 20th ACM Symposium on Operating Systems Principles, (Oct. 2005).

Alex Ho, Michael Fetterman, Christopher Clark, Andrew Warfield, Steven Hand, "Practical Taint-Based Protection using Demand Emulation," ACM SIGOPS Operating Systems Review, 40:29-41, (2006).

Jason E. Holt, "Logcrypt: Forward Security and Public Verification for Secure Audit Logs," In Proceedings of the Australasian workshops on Grid Computing and E-research, pp. 203-211, (2006).

Shvetank Jain, Fareha Shafique, Vladan Djeric, Ashvin Goel, "Application-Level Isolation and Recovery with Solitude," In Proceedings of the 3rd ACM SIGOPS/EuroSys European Conference on Computer Systems, pp. 95-107 (Apr. 2008).

Caroline Jay, Mashhuda Glencross, Roger Hubbold, "Modeling the Effects of Delayed Haptic and Visual Feedback in a Collaborative Virtual Environment," ACM Transactions on Computer-Human Interaction, (Aug. 2007).

Xuxian Jiang, Xinyuan Wang, Dongyan Xu, "Stealthy Malware Detection through VMM-based 'Out-of-the-Box' Semantic View Reconstruction," In Proceedings of the 14th ACM conference on Computer and Communications Security, pp. 128-138 (2007).

Stephen T. Jones, Andrea C. Arpaci-Dusseau, Remzi H. Arpaci-Dusseau, "Antfarm: Tracking Processes in a Virtual Machine Environment," In Proceedings of the Annual Conference on USENIX, pp. 1-14, (2006).

Stephen T. Jones, Andrea C. Arpaci-Dusseau, Remzi H. Arpaci-Dusseau, "Geiger: Monitoring the Buffer Cache in a Virtual Machine Environment," SIGPLAN Not., 41(11):13-23 (2006).

Gene H. Kim & Eugene H. Spafford, "The Design and Implementation of Tripwire: A File System Integrity Checker," On Proceedings of the 2nd ACM Conference on Computer and Communications Security, pp. 1-21, (1993).

Lionel Litty, H. Andrés Lagar-Cavilla, David Lie, "Hypervisor Support for Identifying Covertly Executing Binaries," In Proceedings of USENIX Security Symposium, pp. 1-16, (2008).

Nguyen Anh Quynh & Yoshiyasu Takefuji, "Towards a Tamper-Resistant Kernel Rootkit Detector," In ACM symposium on Applied Computing, pp. 276-283, (2007).

Ronald Perez, Leendert van Doorn, Reiner Sailer, "Virtualization and Hardware-Based Security," IEEE Security and Privacy, v.6 n.5, pp. 24-31, (Sep. 2008).

Sean Quinlan & Sean Dorward, "Venti: A New Approach to Archival Storage," In Proceedings of the USENIX Conference on File and Storage Technologies, pp. 89-101, (2002).

(56) References Cited

OTHER PUBLICATIONS

Arvind Seshadri, Mark Luk, Ning Q , Adrian Perrig, "SecVisor: A Tiny Hypervisor to Provide Lifetime Kernel Code Integrity for Commodity OSes," In ACM SIGOPS Symposium on Operating Systems Principles, pp. 335-350, (2007).

Ben Shneiderman, "Response Time and Display Rate in Human Performance with Computers," ACM Computing Surveys (CSUR), v.16 n.3, pp. 265-285, (Sep. 1984).

Asia Slowinska & Herbert Bos, "Pointless Tainting? Evaluating the Practicality of Pointer Tainting," In Proceedings of EuroSys, (Apr. 2009).

Notification of Transmittal of the International Search Report and the Written Opinion of the International Searching Authority, or the Declaration for International Application No. PCT/US2012/036760 (Nov. 23, 2012).

Apache Avro, http://avro.apache.org/ (Jan. 2011).

Xu et al., "Prefix-Preserving IP Address Anonymization: Measurement-based Security Evaluation and a New Cryptography-based Scheme," IEEE International Conference on Network Protocols, pp. 1-29 (Nov. 2002).

Luke Lonergan, "Greenplum: Driving the Future of Data Warehousing and Analytics," http://www.greenplum.com/ (Jan. 2010).

LBNL/ICSI Enterprise Tracing Project, Overview, http://www.icir.org/enterprise-tracing/ (Jan. 2011).

H. Moore. The Metasploit Project, See http://www.metasploit.com (2006).

Sensage 4, http://www.sensage.com/products/sensage-40.php (Jan. 2011).

SiLK: System for Internet-Level Knowledge, http://tools.netsa.cert.org/silk/ (Jan. 2011).

AutoIt v3. See http://www.autoitscript.com/autoit3/ (2008).

Dan Farmer & Wietse Venema, "Forensic Discovery," Preface, Addison-Wesley Professional (2006).

A. Ionescu, "Visual Basic NTFS Programmer's Guide," Relsoft Technologies, NTFS On-Disk Structures, See http://www.alex-ionescu.com/NTFS.pdf, (2004).

National Institute of Standards and Technology (NIST), "National Software Reference Library," http://www.nsrl.nist.gov/ (2009).

B. Schneier & J. Kelsey, "Secure Audit Logs to Support Computer Forensics." ACM Transactions of Information and System Security, 1(3), (1999).

The Iometer Project. See http://www.iometer.org/ (2001).

* cited by examiner

```
0 exit:
1   in al, 0x7          ; Chain 1
2   mov eax, 0xFF       ; Chain 2 begins
3   mov ebx, 0x30       ; Chain 2
4   cmp eax, 0xFF       ; Chain 2
5   je exit             ; Chain 2 ends
6   mov eax, fs:[ebx]   ; Chain 3 begins
    ...
```

FIG. 1

```
LoadLibraryA("urlmon")
URLDownloadToCacheFile(
    URL = "http://(omitted).cz.cc/
                  out.php?a=36&p=5",
    CacheFile = "\%tmp\%")
CreateProcessA(App = "\%tmp\%", Cmd = (null))
TerminateThread(Thread = -2, ExitCode = 0)
```

FIG. 8

```
GlobalAlloc(Flags = 0x0, Bytes = 8192)
VirtualProtect(Addr = 0x7c86304a, Size = 4096,
    Protect = 0x40)
VirtualProtect(Addr = 0x7c86304a, Size = 4096,
    Protect = 0x20)
LoadLibraryA("user32")
VirtualProtect(Addr = 0x77d702d3, Size = 4096,
    Protect = 0x40)
VirtualProtect(Addr = 0x77d702d3, Size = 4096,
    Protect = 0x20)
LoadLibraryA("ntdll")
VirtualProtect(Addr = 0x7c918c2e, Size = 4096,
    Protect = 0x40)
VirtualProtect(Addr = 0x7c918c2e, Size = 4096,
    Protect = 0x20)
LoadLibraryA("urlmon")
URLDownloadToCacheFile(
    URL = "http://www.(omitted).net/file.exe",
    CacheFile = "\%tmp\%")
CreateProcessA(App=(null), Cmd="cmd /c \%tmp\%")
...
```

FIG. 9

```
GetFileSize(hFile = 0x4)
GetTickCount()
GlobalAlloc(Flags = 0x40, Bytes = 4) = buf*
ReadFile(hFile = 0x0, Buf* = buf*, Len = 4)
...continues to loop in this sequence....
```

FIG. 10

```
LoadLibraryA("urlmon")
LoadLibraryA("shell32")
GetTempPathA(Len = 64, Buffer = "C:\TEMP\")
URLDownloadToFile(
    URL = "http://(omitted).php?
spl=pdf_sing&s=0907...(omitted)...FC2_1
&fh=",
    File = "C:\TEMP\a.exe")
ShellExecuteA(File = "C:\TEMP\a.exe")
ExitProcess(ExitCode = 1415330371),
```

FIG. 11

METHODS, SYSTEMS, AND COMPUTER READABLE MEDIA FOR DETECTING INJECTED MACHINE CODE

PRIORITY CLAIM

This application claims the benefit of U.S. Provisional Patent Application Ser. No. 61/483,613, filed May 6, 2011; the disclosure of which is incorporated herein by reference in its entirety.

TECHNICAL FIELD

The subject matter described herein relates to detecting injected machine code. More specifically, the subject matter relates to methods, systems, and computer readable media for detecting injected machine code.

BACKGROUND

Code injection attacks exploit "bugs" within computer programs for the purpose of injecting code into the program and changing its course of execution. The "bugs" exploited by code injection attacks typically are the result of a failure to appreciate a possible input or the confusion of user input with system commands. Code injection attacks often have disastrous consequences and are commonly utilized by malicious programs, such as computer worms.

Detecting the presence of injected code is often the key to detecting a code injection attack. One technique for detecting injected code involves examining data (e.g., data from a network stream or process buffer) and executing its content while performing forensic analysis. In order to allow for effective monitoring, such a technique often utilizes a software-based central processing unit (CPU) emulator to perform the execution. The use of software-based CPU emulators for executing data associated with suspected injected code is, however, susceptible to evasive attacks that exploit discrepancies between the emulated CPU and an actual hardware CPU.

Computer virtualization or hardware virtualization is the full or partial simulation of a computer or computing platform ("virtual" or "guest" machine) by an actual computer or computing platform ("host" machine). The software or firmware on the "host" machine that manages the "virtual" machine is commonly referred to as a "hypervisor." Virtualization is often associated with both hardware and administrative efficiency and is being increasingly employed for a wide range of applications.

One aspect of hardware virtualization is its ability to provide a platform for monitoring execution that, unlike that supported by a software emulated CPU, occurs directly on the hardware. Executing data associated with suspected injected code on virtualized hardware may therefore enable forensic analysis of the code while eliminating vulnerabilities introduced by software-based CPU emulation.

Accordingly, a need exists for methods, systems, and computer readable media for detecting injected machine code.

SUMMARY

According to one aspect, the subject matter described herein includes a method for detecting injected machine code. The method includes extracting data content from a buffer. The method also includes providing an operating system kernel configured to detect injected machine code. The method further includes executing, using the operating system kernel, the data content on a physical processor. The method further includes monitoring, using the operating system kernel, the execution of the data content to determine whether the data content contains injected machine code indicative of a code injection attack.

According to another aspect, the subject matter described herein includes a system for detecting injected machine code. The system includes an operating system kernel configured to detect injected machine code. The operating system kernel includes a buffer execution module configured to extract data content from a buffer and execute, using the operating system kernel, the data content on a physical processor. The operating system kernel also includes an injected machine code analysis module configured to monitor, using the operating system kernel, the execution of the data content to determine whether the data content contains injected machine code indicative of a code injection attack.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 1 is an exemplary snippet of code illustrating the susceptibility of emulation-based techniques due to performance-boosting optimizations that skip an execution chain if the starting instruction was already executed during a previous execution chain;

FIG. 8 is a code snippet illustrating an API call sequence exhibited by a disproportionate number of benign and malicious PDF files in which diagnostics were not successfully completed as part of an empirical evaluation of a system for detecting injected machine code in accordance with embodiments of the subject matter described herein;

FIG. 9 is a code snippet illustrating a partial call trace for a self-contained payload that was only partially analyzed by the diagnostics as part of an empirical evaluation of a system for detecting injected machine code in accordance with embodiments of the subject matter described herein;

FIG. 10 is a code snippet illustrating a partial API call sequence associated with analysis resistant shellcode observed as part of an empirical evaluation of a system for detecting injected machine code in accordance with embodiments of the subject matter described herein;

FIG. 11 is a code snippet illustrating a typical API call sequence associated with the second stage of an ROP-based PDF code injection attack observed as part of an empirical evaluation of a system for detecting injected machine code in accordance with embodiments of the subject matter described herein.

DETAILED DESCRIPTION

Figure 2:
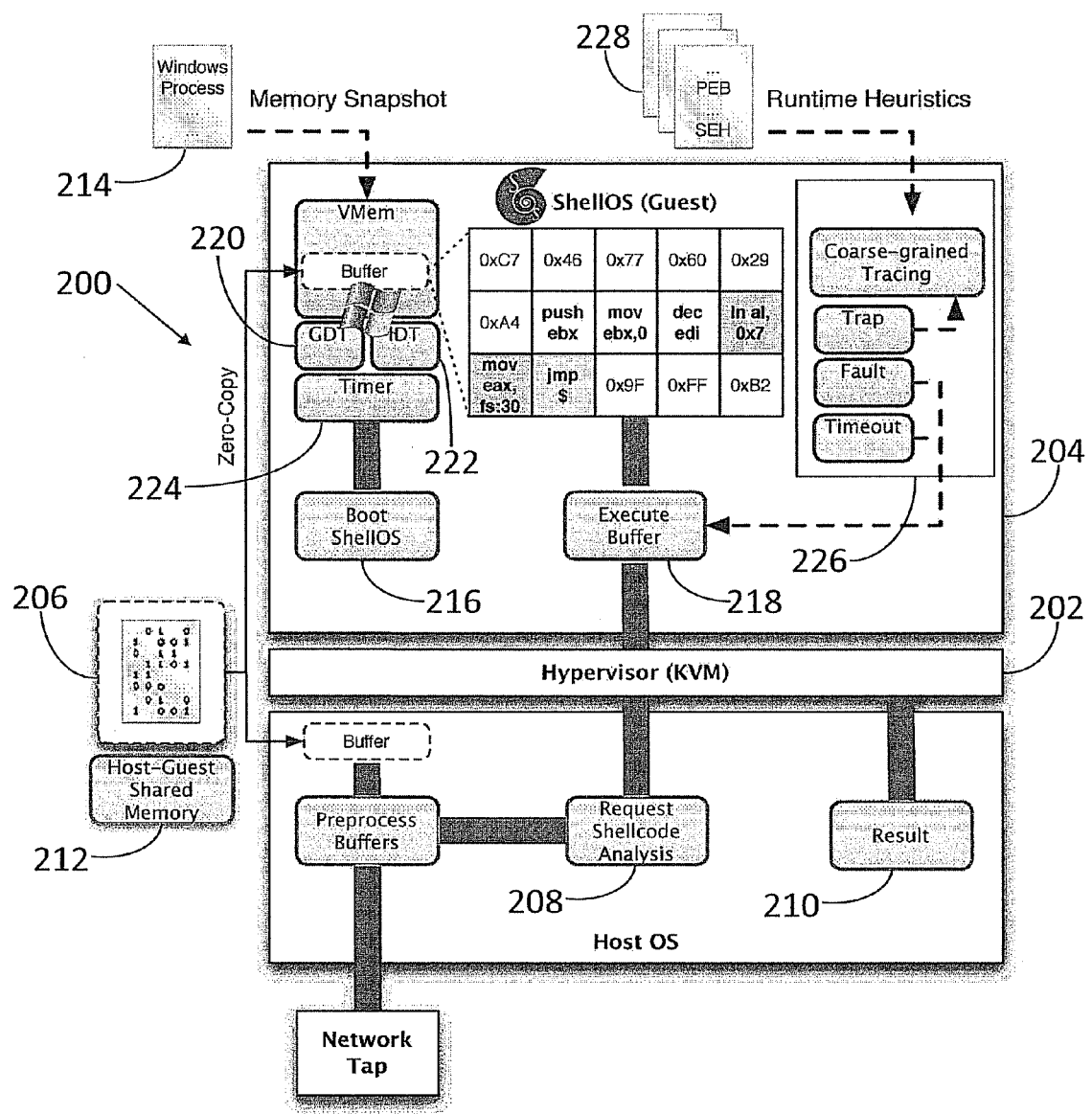
FIG. 2 illustrates an exemplary architecture for detecting injected machine code in accordance with embodiments of the subject matter described herein.

Methods, systems, and computer readable media for detecting injected machine code are provided.

The easy availability of off-the-shelf exploitation toolkits for compromising hosts, coupled with the rapid rate of exploit discovery and disclosure, has made exploit or vulnerability-based detection far less effective than it once was. For instance, the increasing use of metamorphic and polymorphic techniques to deploy code injection attacks continues to confound signature-based detection techniques. The key to detecting these attacks lies in the ability to discover the presence of the injected code (or, shellcode). One promising technique for doing so is to examine data (be that from network streams or buffers of a process) and efficiently execute its content to find what lurks within. Unfortunately, current approaches for achieving this goal are not scalable, primarily because of their reliance on software-based CPU emulators. In accordance with embodiments of the subject matter described herein, a new framework that leverages hardware virtualization to better enable the detection of code injection attacks is presented. Also presented is an account of an experience using this framework to analyze a corpus of malicious PDFs and network-based attacks.

In recent years, code-injection attacks have become a widely popular form of attack on network services (e.g., web servers and file servers) and client-based programs (e.g., browsers and document viewers). These attacks are used to deliver and run arbitrary code (coined shellcode) on victims' machines, often enabling unauthorized access and control of the machine. In traditional code-injection attacks, the code is delivered by the attacker directly, rather than relying on code that already exists within the vulnerable application, as in return-to-libc attacks. Depending on the specifics of the vulnerability that the attacker is targeting, injected code can take several forms, including source code for an interpreted scripting-language, intermediate byte-code, or natively-executable machine code [13].

Typically, though not always, the vulnerabilities being exploited arise from the failure to properly define and reject improper input. These failures have been exploited by several classes of code-injection techniques, including buffer overflows [20], heap spray attacks [5, 30], and return oriented programming (ROP)-based attacks [1], to name a few. One prominent and contemporary example embodying these attacks involves the use of popular, cross-platform document formats, like the Portable Document Format (PDF), to help compromise systems.

Many believe that malicious PDF files started appearing on the Internet in late 2008, and their appearance has been attributed to the fact that around that same time, Adobe Systems published their PDF format specifications for the first time. Irrespective of when they started to appear, the reason for their rise in popularity as a method for compromising hosts is obvious: it is supported on all major operating systems, it supports a bewildering array of functionality (e.g., Javascript and Flash), and some applications (e.g., email clients) render them automatically. Moreover, the "stream objects" in PDF allow many types of encodings (or "filters" in the PDF language) to be used, including multi-level compression, obfuscation, and even encryption.

It is not surprising that malware authors quickly realized that these features could be used for nefarious purposes. Today, malicious PDFs are being distributed via mass mailing, targeted email, and drive-by downloads [27]. These files carry an infectious payload that, for example, may come in the form of one or more embedded executables within the file itself (as was the case in recent exploits; see, for example, "Sophisticated, targeted malicious PDF documents exploiting CVE-2009-4324" at http://isc.sans.edu/diary.html?storyid=7867), or contain shellcode that, after successful exploitation, downloads additional components.

The key to detecting these attacks lies in accurately discovering the presence of the shellcode in network payload or process buffers. This, however, is a significant challenge because of the prevalent use of metamorphism (i.e., the replacement of a set of instructions by a functionally-equivalent set of different instructions) and polymorphism (i.e., a similar technique that hides a set of instructions by encoding—and later decoding—them), that allows the shellcode to change its appearance significantly from one attack to the next.

A promising technique for detecting shellcode is to examine the input—be that network streams or buffers from a process—and efficiently execute its content to find what lurks within. In accordance with embodiments of the subject matter described herein, a novel approach based on a new microkernel, called ShellOS, built specifically to address the shortcomings of current analysis techniques that use software-based CPU emulation to achieve the same goal (e.g., [4, 6, 11, 21, 22, 34]) is presented. Unlike past approaches, hardware virtualization is utilized to allow for far more efficient and accurate inspection of buffers by directly executing instruction sequences on the CPU. In doing so, we reduce exposure to evasive attacks that take advantage of discrepancies introduced by software emulation.

Early attempts to address the problems facing signature-based detection systems attempted to find the presence of malicious code (for example, in network streams) by searching for tell-tale signs of executable code. For instance, Toth and Kruegel [31] applied a form of static analysis, coined abstract payload execution, to analyze the execution structure of network payloads. While promising, Fogla et al. [7] showed that polymorphism defeats this detection approach. Moreover, the underlying assumption that shellcode must conform to discernible representations on the wire was shown by several researchers [15, 25, 33] to be unfounded.

Going further, Polychronakis et al. [22] proposed the use of dynamic code analysis using emulation techniques to uncover shellcode. In their approach, the bytes off the wire are translated into assembly instructions, and a CPU emulator is used to execute the instruction sequences starting at each byte offset in the inspected input. The sequence of instructions starting from a given offset in the input is called an execution chain. The key observation is that to be successful, the shellcode must execute a valid execution chain, whereas instruction sequences from benign data are likely to contain invalid instructions, access invalid memory addresses, cause general protection faults, etc. Hence, a network stream can be flagged as malicious if there is a single execution chain within the inspected input that does not cause fatal faults in the emulator. This general notion of network-level emulation has garnered much attention of late (e.g., [11, 21, 32, 34]).

Recently, Cova et al. [4] and Egele et al. [6] extended this idea to protect web browsers from so-called "heapspray" attacks, where an attacker coerces an application to allocate many objects containing malicious code in order to increase the success rate of an exploit that jumps to locations in the heap [30]. These attacks are particularly effective in browsers, where an attacker can use JavaScript to allocate many malicious objects [2, 29]. Heap spraying has been used in several high profile attacks on major browsers and PDF readers. Several Common Vulnerabilities and Exposure (CVE) disclosures have been released about these attacks in the wild.

Although runtime analysis of payloads using software-based CPU emulation techniques has been successful in detecting exploits in the wild [6, 23], the use of software emulation makes them susceptible to multiple methods of evasion [14, 17, 28]. Moreover, as will be described in greater detail below, software emulation is not scalable. One objective of the subject matter described herein is to forgo software-based emulation altogether, and explore the design and implementation of components necessary for robust detection of code injection attacks.

As indicated above, prior art in detecting code injection attacks has applied a trap-and-emulate approach, whereby data is translated into its corresponding instructions, and then emulated in software. Obviously, the success of such approaches rests on accurate software emulation; however, the instruction set for modern CISC architectures is very complex, and so it is unlikely that software emulators will ever be bug free [14].

As a case-in-point, the popular and actively developed QEMU emulator does not faithfully emulate the FPUbased Get Program Counter (GetPC) instructions, such as fnstenv (see https://bugs.launchpad.net/qemu/+bug/661696, November, 2010). Consequently, some of the most commonly used code injection attacks fail to execute properly. While this may be a boon to QEMU users employing it for full-system virtualization (as one rarely requires a fully faithful fnstenv implementation), using this software emulator as-is for injected code detection would be fairly ineffective.

To address accurate emulation of machine instructions typically used in code injection attacks, lightweight CPU emulators (e.g. nemu [24], libemu) were developed. Unfortunately, they suffer from a different problem: large subsets of instructions rarely used by injected code are skipped when encountered in the instruction stream. The result is that any discrepancy between an emulated instruction and the behavior on real hardware potentially allows shellcode to evade detection by altering its behavior once emulation is detected [17, 28]. Indeed, the ability to detect emulated environments is already present in modern exploit toolkits.

Arguably, a more practical limitation of emulation-based detection is that performance. When this approach is used in network-level emulation, for example, the overhead can be non-trivial since (i) the vast majority of network streams will contain benign data, some of which might be significant in size, (ii) successfully detecting even non-sophisticated shellcode can require the execution of thousands of instructions, and (iii) a separate execution chain must be attempted for each offset in a network stream because the starting location of injected code is unknown.

To avoid these obstacles, the current state of practice is to limit run-time analysis to the first n bytes (e.g., 64 kb) of one side of a network stream, to examine flows to only known servers or from known services, or to terminate execution after some threshold of instructions (e.g., 2048) has been reached [21, 23, 34]. It goes without saying that imposing such stringent run-time restrictions inevitably leads to the possibility of missing attacks (e.g., in the unprocessed portions of streams).

Lastly, it is not uncommon for emulation-based techniques to omit processing of some execution chains as a performance-boosting optimization (e.g., only executing instruction sequences that contain a GetPC instruction, or skipping an execution chain if the starting instruction was already executed during a previous execution chain). Unfortunately, such optimizations are unsafe, in that they are susceptible to evasion. For instance, if only instruction sequences that contain a GetPC instruction are executed, metamorphic code may evade detection by, for example, pushing data representing a GetPC instruction to the stack and then executing it.

FIG. 1 is an exemplary snippet of code illustrating the susceptibility of emulation-based techniques due to performance-boosting optimizations that skip an execution chain if the starting instruction was already executed during a previous execution chain. Referring to FIG. 1, the first execution chain ends after a single privileged instruction. The second execution chain executes instructions 2 to 5 before ending due to a conditional jump to a privileged instruction. Now, since instructions 3, 4, and 5 were already executed in the second execution chain they are skipped (as a beginning offset) as a performance optimization. The third execution chain begins at instruction 6 with an access to the Thread Environment Block (TEB) data structure to the offset specified by ebx. Had the execution chain beginning at instruction 3 not been skipped, ebx would be loaded with 0x30. Instead, ebx is now loaded with a random value set by the emulator at the beginning of each execution chain. Thus, if detecting an access to the memory location at fs:[0x30] is critical to detecting injected code, the attack will be missed.

Unlike the trap-and-emulate approach, the subject matter described herein takes advantage of the observation that the most widely used heuristics for shellcode detection exploit the fact that, to be successful, the injected shellcode typically needs to read from memory (e.g., from addresses where the payload has been mapped in memory, or from addresses in the Process Environment Block (PEB)), the payload written to some memory area (especially in the case of polymorphic shellcode), or the flow transferred to newly created code [12, 18, 19, 21-24, 32, 34]. For instance, the execution of shellcode often results in the resolution of shared libraries (DLLs) through the PEB. In accordance with embodiments of the subject matter described herein, rather than tracing each instruction and checking whether its memory operands can be classified as "PEB reads," instruction sequences are allowed to execute directly on the CPU using hardware virtualization, and only specific memory reads, writes, and executions are traced through hardware-supported paging mechanisms.

FIG. 2 illustrates an exemplary architecture for detecting injected machine code in accordance with embodiments of the subject matter described herein. Referring to FIG. 2, the design for enabling hardware-support of code injection attacks, generally designated 200, is built upon a virtualization solution [10] known as Kernel-based Virtual Machine (KVM). The KVM hypervisor 202 is used to abstract Intel VT and AMD-V hardware virtualization support. At a high level, the KVM hypervisor 202 is composed of a privileged domain and a virtual machine monitor (VMM). The privileged domain is used to provide device support to unprivileged guests. The VMM, on the other hand, manages the physical CPU and memory and provides the guest with a virtualized view of the system resources.

In a hardware virtualized platform, the VMM only mediates processor events (e.g., via instructions such as VMEntry and VMExit on the Intel platform) that would cause a change in the entire system state, such as physical device IO, modifying CPU control registers, etc. Therefore, it no longer emulates guest instruction executions as with software virtualization; execution happens directly on the processor. The subject matter described herein takes advantage of this design and utilizes a new micro-kernel 204, called ShellOS, that runs as a guest OS using KVM and whose sole task is to detect and analyze code injection attacks.

ShellOS 204 can be viewed as a black box, wherein a buffer 206 is supplied to ShellOS 204 by the privileged domain for inspection via an API call 208. ShellOS 204 performs the analysis and reports result 210, indicating (1) if injected code was found, (2) the location in the buffer 206 where the shellcode was found, and (3) a log of the actions performed by the shellcode.

A library within the privileged domain provides the ShellOS API call 208, which handles the sequence of actions required to initialize guest mode via the KVM ioctl interface. One notable feature of initializing guest mode in KVM is the assignment of guest physical memory from a userspace-allocated buffer 212. This feature is utilized to satisfy a critical requirement—i.e., efficiently moving buffers into ShellOS 204 for analysis. Since offset zero of the userspace-allocated memory region corresponds to the guest physical address of 0x0, a fixed memory range within the guest address space can be reserved for the privileged domain library to write the buffers to be analyzed. These buffers are then directly accessible to the ShellOS guest at the pre-defined physical address.

The privileged domain library also optionally allows the user to specify a process snapshot 214 for ShellOS 204 to use as the default environment. The details about this snapshot are described in greater detail below, but for now it is sufficient to note that the intention is to allow the user to analyze buffers in an environment as similar as possible to what the injected code would expect. For example, a user analyzing buffers extracted from a PDF process may provide an Acrobat Reader snapshot, while one analyzing Flash objects might supply an Internet Explorer snapshot. While malicious code detection may typically occur without this extra data, it provides a realistic environment for post facto diagnostics.

When the privileged domain first initializes ShellOS 204, it completes its boot sequence 216 (detailed below) and issues a VMExit. When the ShellOS API 208 is called to analyze a buffer (e.g., buffer 206), it is copied to the fixed shared region 212 before a VMEnter is issued, triggering buffer execution module 218 to extract buffer 206's data content and execute it on the physical processor. ShellOS 204 completes its analysis and writes the result 210 to the shared region before issuing another VMExit, signaling that the kernel is ready for another buffer. Finally, a thread pool is built into the library where-in each buffer to be analyzed is added to a work queue and one of n workers dequeues the job and analyzes the buffer in a unique instance of ShellOS 204.

To set up the execution environment, the Global Descriptor Table (GDT) 220 is initialized to mimic a Windows environment. More specifically, code and data entries are added for user and kernel modes using a flat 4 GB memory model, a Task State Segment (TSS) entry is added that denies all user-mode IO access, and a special entry that maps to the virtual address of the Thread Environment Block (TEB) is added. The auxiliary FS segment register is set to select the TEB entry, as done by the Windows kernel. Therefore, regardless of where the TEB is mapped into memory, code (albeit benign or malicious) can always access the data structure at FS:[0]. This "feature" is commonly used by injected code to find shared library locations, and indeed, access to this region of memory has been used as a heuristic for identifying injected code [24].

Virtual memory is implemented with paging, and mirrors that of a Windows process. Virtual addresses above 3 GB are reserved for the ShellOS kernel. The kernel supports loading arbitrary snapshots created using the minidump format (e.g., used in tools such as WinDBG) (for the minidump structure details, see http://msdn.microsoft.com/en-us/library/ms680378(VS.85).aspx). The minidump structure contains the necessary information to recreate the state of the running process at the time the snapshot was taken. Once all regions in the snapshot have been mapped, the TEB entry in the Global Descriptor Table 220 is adjusted to point to the actual TEB location in the snapshot.

Recall that ShellOS' primary goal is to enable fast and accurate detection of input containing shellcode. To do so, the ability to execute the instruction sequences starting at every offset in the inspected input must be supported. Execution from each offset is required since the first instruction of the shellcode is unknown. The control loop in ShellOS is responsible for this task. Once ShellOS is signaled to begin analysis, the fpu, mmx, xmm, and general purpose registers are randomized to thwart injection attacks that try to hinder analysis by guessing fixed register values (set by ShellOS) and end execution early upon detection of these conditions. The program counter is set to the address of the buffer being analyzed. Buffer execution begins when ShellOS transitions to user-mode with the iret instruction. At this point, instructions are executed directly on the CPU in usermode until execution is interrupted by a fault, trap, or timeout. The control loop is therefore completely interrupt driven.

A fault is defined as an unrecoverable error in the instruction stream, such as attempting to execute a privileged instruction (e.g., the in al, 0x7 instruction in FIG. 2), or encountering an invalid opcode. The kernel is notified of a fault through one of 32 interrupt vectors indicating a processor exception. The Interrupt Descriptor Table (IDT) 222 points all fault-generating interrupts to a generic assembly-level routine that resets usermode state before attempting the next execution chain. (Registers may be reset via popa and fxrstor instructions, while memory may be reset by traversing page table entries and reloading pages with the dirty bit set.)

On the other hand, a trap is defined as a recoverable exception in the instruction stream (e.g., a page fault resulting from a needed, but not yet paged-in, virtual address), and once handled appropriately, the instruction stream continues execution. Traps provide an opportunity to coarsely trace some actions of the executing code, such as reading an entry in the TEB. To deal with instruction sequences that result in infinite loops, a rudimentary approach is currently employed, wherein ShellOS instructs the programmable interval timer (PIT) 224 to generate an interrupt at a fixed frequency. When timer 224 fires twice in the current execution chain (guaranteeing at least 1 tick interval of execution time), the chain is aborted. Since PIT 224 is not directly accessible in guest mode, KVM emulates PIT timer 224 via privileged domain timer events implemented with hrtimer (for details on hrtimer, see http://www.mjmwired.net/kernel/Documentation/timers/hrtimers.txt), which in turn uses the High Precision Event Timer (HPET) device as the underlying hardware timer. This level of indirection imposes an unavoidable performance penalty because external interrupts (e.g. ticks from a timer) cause a VMExit.

Furthermore, the guest must signal that each interrupt has been handled via an End-of-Interrupt (EOI). The problem here is that EOI is implemented as a physical device IO instruction which requires a second VMExit for each tick. The obvious trade-off is that while a higher frequency timer would allow infinite loops to be exited more quickly, it also increases the overhead associated with entering and exiting guest mode (as to increased number of VMExits). To alleviate some of this overhead, the KVM-emulated PIT 224 may be placed in what is known as Auto-EOI mode. This mode allows new timeout interrupts to be received without requiring a device IO instruction to acknowledge the previous interrupt. In this way, the overhead may be effectively cut in half. Setting appropriate timer frequencies and their implications for run-time performance will be discussed in greater detail below.

The complete ShellOS kernel is composed of 2471 custom lines of C and assembly code.

The ShellOS micro-kernel provides an efficient means to execute arbitrary buffers of code or data, but a mechanism for determining if these execution sequences represent injected code is needed. In accordance with embodiments of the subject matter described herein, ShellOS 204 may include injected machine code analysis module 226 that may utilize existing runtime heuristics 228 to monitor execution of buffer 206 to determine whether the data content contains injected machine code indicative of an attack. Runtime heuristics 228 may be modularly used in an efficient and accurate framework that does not require tracing ever machine-level instruction, or performing unsafe optimizations. A key insight is the observation that existing reliable detection heuristics really do not require fine-grained instruction-level tracing, rather, coarsely tracing memory accesses to specific locations is sufficient.

Recall that an instruction stream will be interrupted with a trap upon accessing a memory location that generates a page fault. A trap may therefore be forced to occur on access to an arbitrary virtual address by clearing the present bit of the page entry mapping for that address. For each address that requires tracing the corresponding present bit is cleared and the OS reserved field is set to indicate that the kernel should trace accesses to this entry. When a page fault occurs, the interrupt descriptor table (IDT) 222 directs execution to an interrupt handler that checks these fields. If the OS reserved field indicates tracing is not requested, then the page fault is handled according to the region mappings defined in the process' snapshot 214. It is noted that regardless of whether the analyzed buffers originate from network streams, PDFs, Flash objects, etc., Windows process snapshot 214 is always loaded in ShellOS in order to populate OS data structures such as the TEB, and to load data commonly present when injected code executes (e.g., shared libraries).

When a page entry does indicate that tracing should occur, and the faulting address (accessible via the CR2 register) is in a list of desired address traps (provided, for example, by an analyst), the page fault must be logged and appropriately handled. In handling a page fault resulting from a trap, the usermode code must first be allowed to access the page, then the trap must be reset immediately to ensure trapping of future accesses to that page. To achieve this, the handler sets the present bit in the page entry (enabling access to the page) and the TRAP bit in the flags register, then returns to the usermode instruction stream. As a result, the instruction that originally caused the page fault is now successfully executed before the TRAP bit forces an interrupt. The IDT 222 then forwards the interrupt to another handler that unsets the TRAP and present bits so that the next access to that location can be traced. The approach allows for tracing of any virtual address access (read, write, execute), without a predefined limit on the number of addresses to trap.

ShellOS, by design, is not tied to any specific set of behavioral heuristics. Any heuristic based on memory reads, writes, or executions can be supported with coarse-grained tracing. In order to highlight the strengths of ShellOS, the PEB heuristic proposed by Polychronakis et al. [24] was implemented in one embodiment. That particular heuristic was chosen for its simplicity, as well as the fact that it has already been shown to be successful in detecting a wide array of Windows shellcode. This heuristic detects injected code that parses the process-level TEB and PEB data structures in order to locate the base address of shared libraries loaded in memory. The TEB contains a pointer to the PEB (address FS:[0x30]), which contains a pointer to yet another data structure (i.e., LDR DATA) containing several linked lists of shared library information.

The detection approach in [24] checks if accesses are being made to the PEB pointer, the LDR DATA pointer, and any of the linked lists. To implement this detection approach, a trap was set on each of these addresses and injected code was reported to have been found when the necessary conditions were met. The heuristic fails to detect certain cases, but it is reiterated that any number of other heuristics could have been chosen instead.

To showcase ShellOS' promise as a platform upon which other modules can be built, a lightweight memory monitoring facility that allows ShellOS to scan buffers created by PDFs loaded in the process space of a prescribed reader (in this case, Adobe Reader) was implemented. The approach taken to detect shellcode in malicious PDFs is to let the reader handle rendering of the content while monitoring any buffers created by it, and signaling ShellOS to scan these buffers for shellcode (using existing heuristics). This approach has several advantages, not the least of which is that it does not require recreating the document object model, handling obfuscated javascript, or dealing with all the other idiosyncrasies that pose challenges for other approaches [4, 6]. The buffers created are simply analyzed when rendering the PDF in a quarantined environment. The challenge, of course, lies in doing all of this as efficiently as possible. To support this goal, a monitoring facility that is able to snapshot the memory contents of processes was developed.

Figure 3:
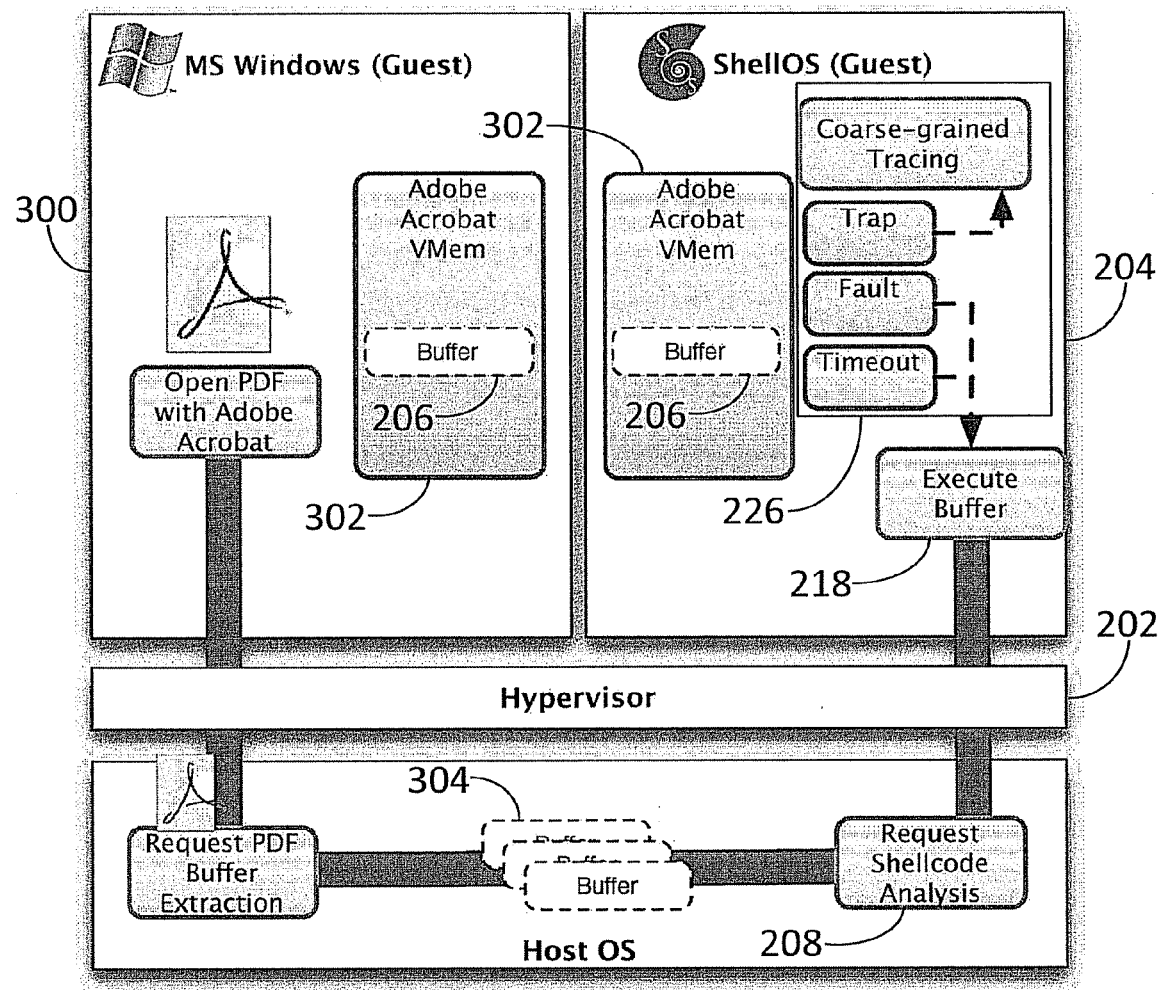
FIG. 3 illustrates a high level view of an exemplary monitoring facility for detecting injected machine code in accordance with embodiments of the subject matter described herein.

FIG. 3 illustrates a high level view of an exemplary monitoring facility for detecting injected machine code in accordance with embodiments of the subject matter described herein. Referring to FIG. 3, monitoring facility 300 is designed so that the snapshots are constructed in a manner that captures the entire process state, the virtual memory layout 302, as well as all the code and data pages within the process. The data pages contain the buffers 304 allocated on the heap, while the code pages contain all the system modules that must be loaded by ShellOS 204 to enable analysis. The memory tracing facility includes less than 900 lines of custom C/C++ code.

This functionality was built specifically for the Windows OS and can support any application running on Windows. The memory snapshots are created using custom software that attaches to an arbitrary application process and stores contents of memory using the functionality provided by Windows' debug library (DbgHelp). Buffers that are allocated on the heap (i.e., pages mapped as RW) are captured, as well as thread and module information. The results are stored in minidump format, which contains all the information required to recreate the process within ShellOS, including all dlls, the PEB/TEB, register state, the heap and stack, and the virtual memory layout of these components.

Although efficiently, and reliably, identifying code injection attacks is a contribution in and of itself, the forensic analysis of the higher-level actions of these attacks is also of significant value to security professionals. To this end, a method for reporting forensic information about a buffer where shellcode has been detected is provided. To achieve this capability, the memory snapshot facility discussed above is utilized to obtain a list of virtual addresses associated with API calls for various shared libraries. Traps are placed on these addresses, and when triggered, a handler for the corresponding call is invoked that pops function parameters off the usermode stack, logs the call and its supplied parameters, performs any actions needed for the successful completion of that call (e.g., allocating heap space), and then returns to the injected code.

Obviously, due to the myriad of API calls available—and their complexity—one can not expect the diagnostics to be complete. Keep in mind, however, that lack of completeness in the diagnostics facility is independent of the actual detection of injected code. The ability to extend the level of diagnostic information is straightforward, but tedious. That said, as will be described in greater detail below, the system is able to provide a wealth of diagnostic information on a diverse collection of self-contained [23] shellcode injection attacks.

In the analysis that follows, ShellOS' ability to faithfully execute network payloads and successfully trigger the detection heuristics when shellcode is found is examined. Next, performance benefits of the ShellOS framework when compared to software-emulation are discussed. Additionally, an experience using ShellOS to analyze a collection of suspicious PDF documents is detailed. All experiments were conducted on an Intel Xeon Quad Processor machine with 32 GB of memory. The host OS was Ubuntu with kernel version 2.6.35.

To evaluate performance, Metasploit was used to launch attacks in a virtualized environment. For each encoder, 100s of attack instances were generated by randomly selecting 1 of 7 exploits, 1 of 9 self-contained payloads that utilize the PEB for shared library resolution, and randomly generated parameter values associated with each type of payload (e.g. download URL, bind port, etc.). As the attacks launched, the network traffic was captured via tcpdump for later network-level buffer analysis.

Several payload instances were encoded using an advanced polymorphic engine, called TAPiON (the TAPiON engine is available at http://pb.specialised.info/all/tapion/). TAPiON incorporates features designed to thwart emulation. Each of the encoders used (see Table 1) are considered to be self-contained [21] in that they do not require additional contextual information about the process they are injected into in order to function properly.

TABLE 1

Off-the-Shelf Shellcode Detection

| Encoder | Nemu | ShellOS |
|---|---|---|
| countdown | Y | Y |
| fnstenv_mov | Y | Y |
| jmp_call_additive | Y | Y |
| shikata_ga_nai | Y | Y |
| call4_dword_xor | Y | Y |
| alpha_mixed | Y | Y |
| alpha_upper | N | Y |
| TAPiON | Y* | Y |

For the sake of comparison, a software-based solution (called Nemu [24]) that is reflective of the current state of the art was chosen. Nemu and ShellOS both performed well in detecting all the instances of the code injection attacks developed using Metasploit, with a few exceptions.

Surprisingly, Nemu failed to detect shellcode generated using the alpha upper encoder. Since the encoder payload relies on accessing the PEB for shared library resolution, it was expected that both Nemu and ShellOS would trigger this detection heuristic. It may be that Nemu is unable to handle this particular case because of inaccurate emulation of its particular instruction sequences—underscoring the need to directly execute the shellcode on bare metal.

More pertinent to the discussion is that while the software-based emulation approach is capable of detecting shellcode generated with the TAPiON engine, performance optimization limits its ability to do so. The TAPiON engine attempts to confound detection by basing its decoding routines on timing components (namely, the RDTSC instruction) and uses a plethora of CPU-intensive coprocessor instructions in long loops to slow runtime-analysis. These long loops quickly reach Nemu's default execution threshold (2048) prior to any heuristic being triggered. This is particularly problematic because no GetPC instruction is executed until these loops complete. Furthermore, software-based emulators simply treat the majority of coprocessor instructions as NOPs. While TAPiON does not currently use the result of these instructions in its decoding routine, it only takes minor changes to the out-of-the-box engine to incorporate these results and thwart detection (hence the "*" in Table 1). ShellOS, on the other hand, fully supports all coprocessor instructions with its direct CPU execution.

More problematic for these classes of approaches is that successfully detecting code encoded by engines such as TAPiON can require following very long execution chains (e.g., well over 60; 000 instructions). To examine the runtime performance of the prototype, 1000 benign inputs were randomly generated, and the instructions thresholds set (in both approaches) to the levels required to detect instances of TAPiON shellcode.

Since ShellOS currently can not directly set an instruction threshold (due to the coarse-grained tracing approach), the required threshold was approximated by adjusting the execution chain timeout frequency. As the timer frequency increases, the number of instructions executed per execution chain decreases. Thus, the maximum frequency needed to execute the TAPiON shellcodes that required 10 k, 16 k, and 60 k instruction executions to complete their loops were experimentally determined. These timer frequencies are 5000 HZ, 4000 HZ, and 1000 HZ, respectively. Note that in the common case, ShellOS can execute many more instructions, depending on the speed of individual instructions. TAPiON code, however, is specifically designed to use the slower FPU-based instructions. (ShellOS can execute over 4 million fast NOP instructions in the same time interval that only 60 k FPU-heavy instructions are executed.)

Figure 4:
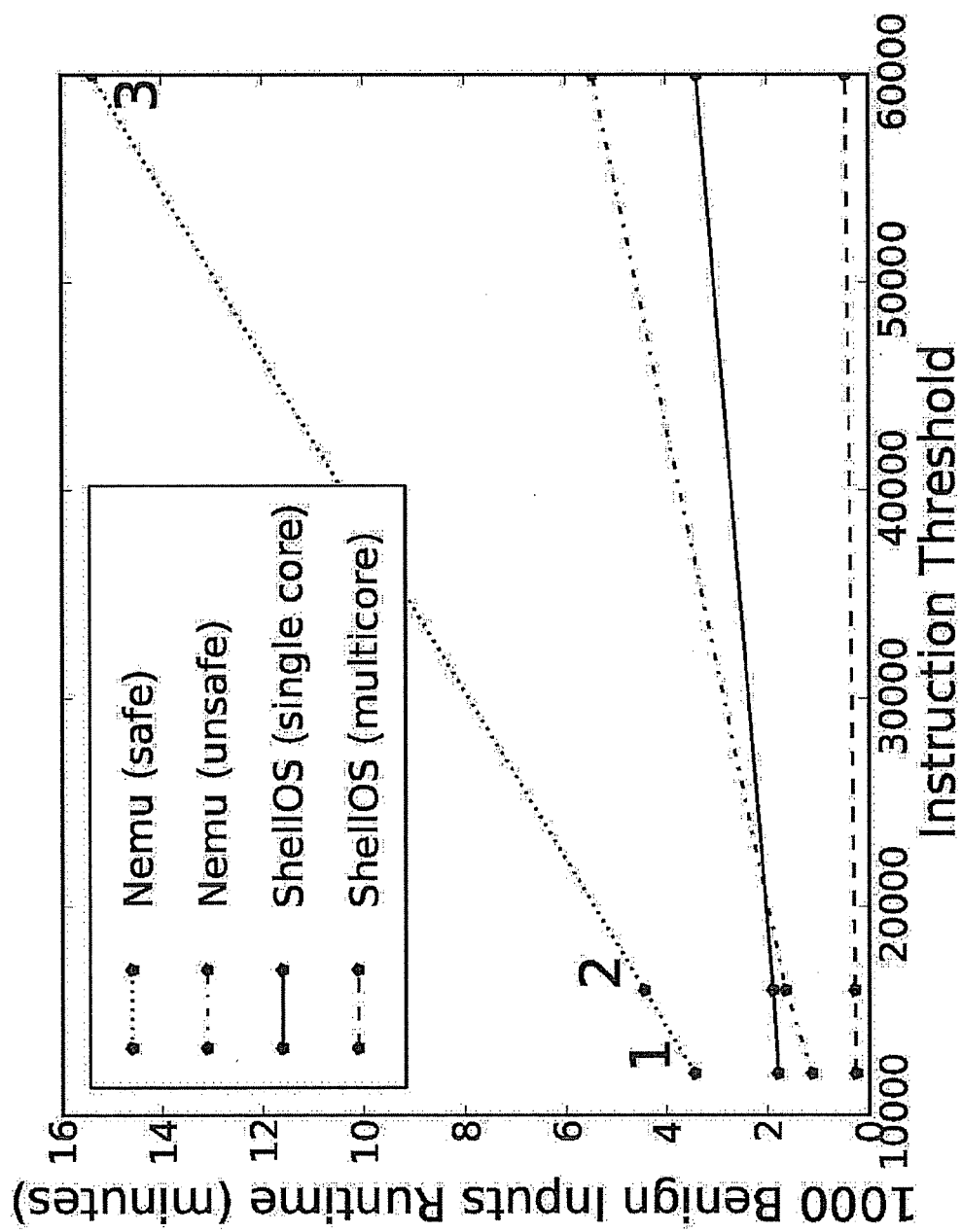
FIG. 4 is a chart illustrating the time required for detecting encoded shellcode samples as part of an empirical evaluation of a system for detecting injected machine code in accordance with embodiments of the subject matter described herein.

FIG. 4 is a chart illustrating the time required for detecting encoded shellcode samples as part of an empirical evaluation of a system for detecting injected machine code in accordance with embodiments of the subject matter described herein. Referring to FIG. 4, the labeled points on the lineplot indicate the minimum execution chain length required to detect the three representative TAPiON samples. For completeness, the performance of Nemu with and without unsafe execution chain pruning (see x3) is shown. When unsafe pruning is used, software-emulation does better than ShellOS on a single core at very low execution thresholds. This is not too surprising, as the higher clock frequencies required to support short execution chains in ShellOS incur additional overhead (see x4). With longer execution chains, however, the real benefit of ShellOS becomes apparent—ShellOS (on a single core) is an order of magnitude faster than Nemu when unsafe execution chain pruning is disabled. It is also noteworthy that the worker queue provided by the ShellOS host-side library efficiently multi-processes buffer analysis, and demonstrates that multi-processing offers a viable alternative to the unsafe elimination of execution chains.

The performance of ShellOS is even more compelling when one takes into consideration the fact that in 64-bit architectures, program counter relative addressing is allowed—hence, there is no need for shellcode to use any form of "Get Program Counter" code to locate its address on the stack; a limitation that has been widely used (e.g., [11, 19, 21, 22, 24]) to detect traditional 32-bit shellcode using (very) low execution thresholds. This means that as 64-bit architectures become commonplace, shellcode detection approaches using dynamic analysis must resort to heuristics that require the shellcode to fully decode. The implications are that the requirement to process long execution chains, such as those already exhibited by today's advanced engines (e.g., Hydra [25] and TAPiON), will be of far more significance than it is today.

As a preliminary analysis of throughput on network data, one day's worth of benign network data from the International Knowledge Discovery and Data Mining Tools Competition was used. (While this dataset has been criticized as being too unrealistic as a basis for evaluating intrusion detection systems (e.g., [16]), it was used here for a completely different purpose, namely as a source of payload-bearing packets to analyze performance on a benign dataset.) In this case, the execution threshold was set for the software-based approach to the 60,000 instruction threshold. At that level, the throughput of ShellOS when processing the first 65 KB of each reassembled stream (as in [23]) is roughly 465 Mbit/s, compared to 74 Mbit/s for Nemu. The libnids (see http://libnids.sourceforge.net/) library was used for TCP stream reassembly.

What follows is a discussion of an experience using the framework to analyze a collection of 427 malicious PDFs. These PDFs were provided by security professionals running a large-scale web malware detection system. Each PDF is labeled with a Common Vulnerability Exposure (CVE) number (or "Unknown" tag). Of these files, 22 were corrupted, leaving a total of 405 files for analysis. A collection of 179 benign PDFs from various USENIX conferences were also used.

The framework was used to launch each document with Adobe Reader and attach the memory facility to that process. The heap was snapshotted as the document was rendered, waiting until the heap buffers stoped growing. 374 of the 405 malicious PDFs resulted in a unique set of buffers. ShellOS is then signaled that the buffers are ready for inspection (see FIG. 4.3.1). Note that the process layout is only generated once per application (e.g., Reader), and subsequent snapshots only contain the heap buffers.

Figure 5:
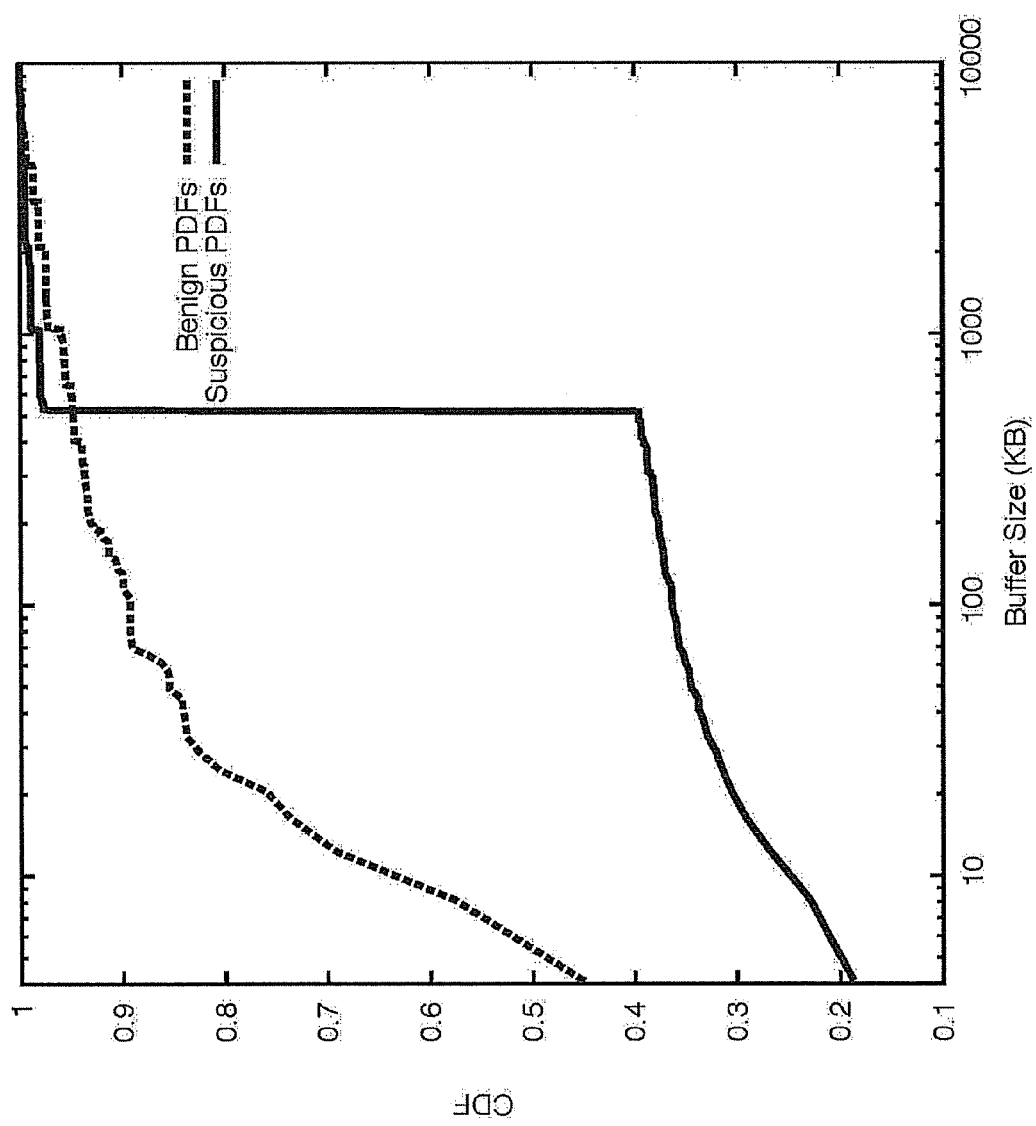
FIG. 5 is a chart illustrating the size distribution of heap buffers extracted from benign and malicious PDF files as part of an empirical evaluation of a system for detecting injected machine code in accordance with embodiments of the subject matter described herein.

FIG. 5 is a chart illustrating the size distribution of heap buffers extracted from benign and malicious PDF files as part of an empirical evaluation of a system for detecting injected machine code in accordance with embodiments of the subject matter described herein. Referring to FIG. 5, notice that $\approx$60% of the buffers extracted from malicious PDF are 512K long. This striking feature can be attributed to the heap allocation strategy used by the Windows OS, whereby chunks of 512K and higher are memory aligned at 64K boundaries. As noted by Ding et al. [5], attackers can take advantage of this alignment to increase the success rate of their attacks (e.g., by providing a more predictable landing spot for the shellcode when used in conjunction with large NOP-sleds).

Table 2 provides a breakdown of the corresponding CVE listings for the 325 unique code injection attacks detected. Interestingly, only 70 attacks were detected using Return Oriented Programming (ROP) because of their second-stage exploit (CVE-2010-2883) triggering the PEB heuristic.

TABLE 2

| CVE Distribution for Detected Attacks | |
| --- | --- |
| CVE | Detected |
| CVE-2007-5659 | 2 |
| CVE-2008-2992 | 10 |
| CVE-2009-4324 | 12 |
| CVE-2009-2994 | 1 |
| CVE-2009-0927 | 33 |
| CVE-2010-0188 | 53 |
| CVE-2010-2883 | 70 |
| Unknown | 144 |

Figure 6:
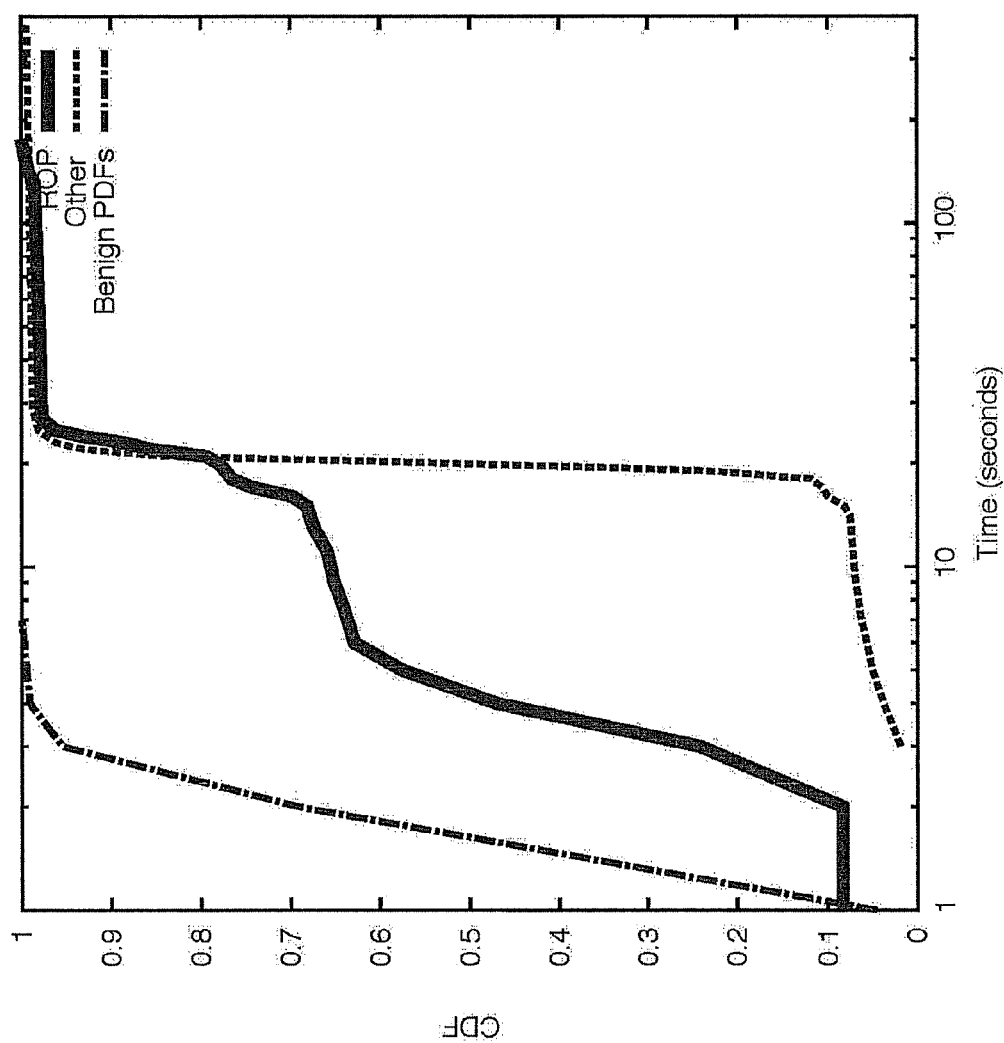
FIG. 6 is a chart illustrating the distribution for extracting heap objects from benign and malicious PDF files as part of an empirical evaluation of a system for detecting injected machine code in accordance with embodiments of the subject matter described herein.

FIG. 6 is a chart illustrating the distribution for extracting heap objects from malicious and benign documents as part of an empirical evaluation of a system for detecting injected machine code in accordance with embodiments of the subject matter described herein. Referring to FIG. 6, the time distribution for malicious documents is further broken down by "ROP-based" (i.e., CVE-2010-2883) and other exploits. The group labeled other performed more traditional heap-spray attacks with self-contained shellcode, and is not particularly interesting (at least, from a forensic standpoint). In either case, the system was able to extract approximately 98% of the buffers within 26 seconds. For the benign files, extraction took less than 5 seconds for 98% of the documents. The low processing time of the benign case is because the buffers are allocated just once when the PDF is rendered on open, as opposed to hundreds of heap objects created by the embedded javascript that performs the heap-sprays.

Figure 7:
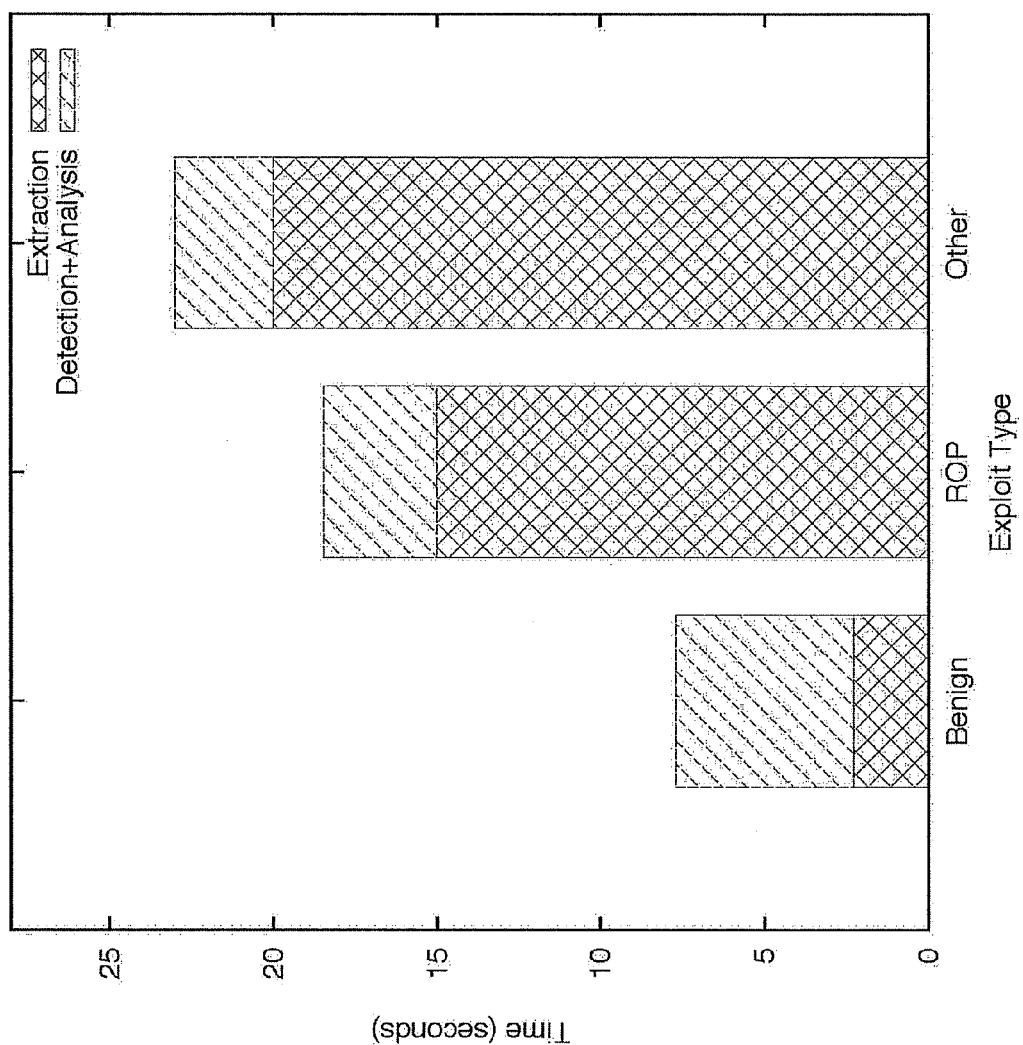
FIG. 7 is a chart illustrating the breakdown of the overall time for analyses of benign and malicious PDF files as part of an empirical evaluation of a system for detecting injected machine code in accordance with embodiments of the subject matter described herein.

FIG. 7 is a chart illustrating the breakdown of the overall time for analyses of benign and malicious PDF files as part of an empirical evaluation of a system for detecting injected machine code in accordance with embodiments of the subject matter described herein. Referring to FIG. 7, notice that the majority of the time can be attributed to buffer extraction. Once signaled, ShellOS analyzes the buffers at high speed. The average time to analyze a benign PDF (the common case, hopefully) is only 5.46 seconds with the unoptimized code.

It is again noted that the framework provided is not tied to any particular method of buffer extraction. To the contrary, ShellOS executes any arbitrary buffer supplied by the analyst and reports if the desired heuristics are triggered. In this case-study, the usefulness of ShellOS was highlighted with buffers provided by the PDF pre-processor. The main focus here is in enabling fast and accurate detection of shellcode within input streams.

Some of the patterns observed lurking within PDF-based code injection attacks are described below.

FIG. 8 is a code snippet illustrating an API call sequence exhibited by a disproportionate number of benign and malicious PDF files in which diagnostics were not successfully completed as part of an empirical evaluation of a system for detecting injected machine code in accordance with embodiments of the subject matter described herein. Recall that once injected code is detected, ShellOS continues to allow execution to collect diagnostic traces of Windows API calls before returning a result. In the majority of cases, the diagnostics completed successfully for the PDF dataset. Of the diagnostics performed in the other category, 85% of the injected code was found to have exhibited an identical API call sequence.

Referring to FIG. 8, the top level domains were always cz.cc and the GET request parameters varied only in numerical value. All of the remaining PDFs in the other category (where diagnostics succeeded) used either the URLDownloadToCacheFile or URLDownloadToFile API call to download a file, then executed it with CreateProcessA, WinExec, or ShellExecuteA. Two of these shellcodes attempted to download several binaries from the same domain, and a few of the requested URLs contained obvious text-based information pertinent to the exploit used, e.g. exp=PDF (Collab), exp=PDF (Geticon), or ex=Util.Printf—presumably for bookkeeping in an overall diverse attack campaign.

Two of the self-contained payloads were only partially analyzed by the diagnostics, and proved to be quite interesting. FIG. 9 is a code snippet illustrating a partial call trace for a self-contained payload that was only partially analyzed by the diagnostics as part of an empirical evaluation of a system for detecting injected machine code in accordance with embodiments of the subject matter described herein. Referring to FIG. 9, the injected code allocates space on the heap, then copies code into that heap area. Although the code copy is not apparent in the API call sequence alone, ShellOS may also provide an instruction-level trace (when requested by the analyst) by single-stepping each instruction via the TRAP bit in the flags register. The assembly-level copies were observed using this feature. The code then proceeds to patch several DLL functions, partially observed in this trace by the use of API calls to modify page permissions prior to patching, then resetting them after patching. Again, the assembly-level patching code is only observable in a full instruction trace. Finally, the shellcode performs the conventional URL download and executes that download.

A second interesting case challenged the prototype diagnostics by applying some anti-analysis techniques. FIG. 10 is a code snippet illustrating a partial API call sequence associated with analysis resistant shellcode observed as part of an empirical evaluation of a system for detecting injected machine code in accordance with embodiments of the subject matter described herein. Referring to FIG. 10, as ShellOS does not currently address context-sensitive code, there is no way of providing the file size expected by this code. Furthermore, the required timing characteristics for this particular sequence are not provided as the API call handlers merely attempt to provide a 'correct' value, with minimal behind-the-scenes processing. As a result, this sequence of API calls is repeated in an infinite loop, preventing further automated analysis. It is noted, however, that this particular challenge is not unique to ShellOS.

FIG. 11 is a code snippet illustrating a typical API call sequence associated with the second stage of an ROP-based PDF code injection attack observed as part of an empirical evaluation of a system for detecting injected machine code in accordance with embodiments of the subject matter described herein. Referring to FIG. 11, of the 70 detected ROP-based exploit PDFs, 87% of the second stage payloads adhered to the illustrated API call sequence. Of the remaining payloads, 6 use an API not yet supported in ShellOS, while the others are simple variants on this conventional URL download pattern.

Figure 12:
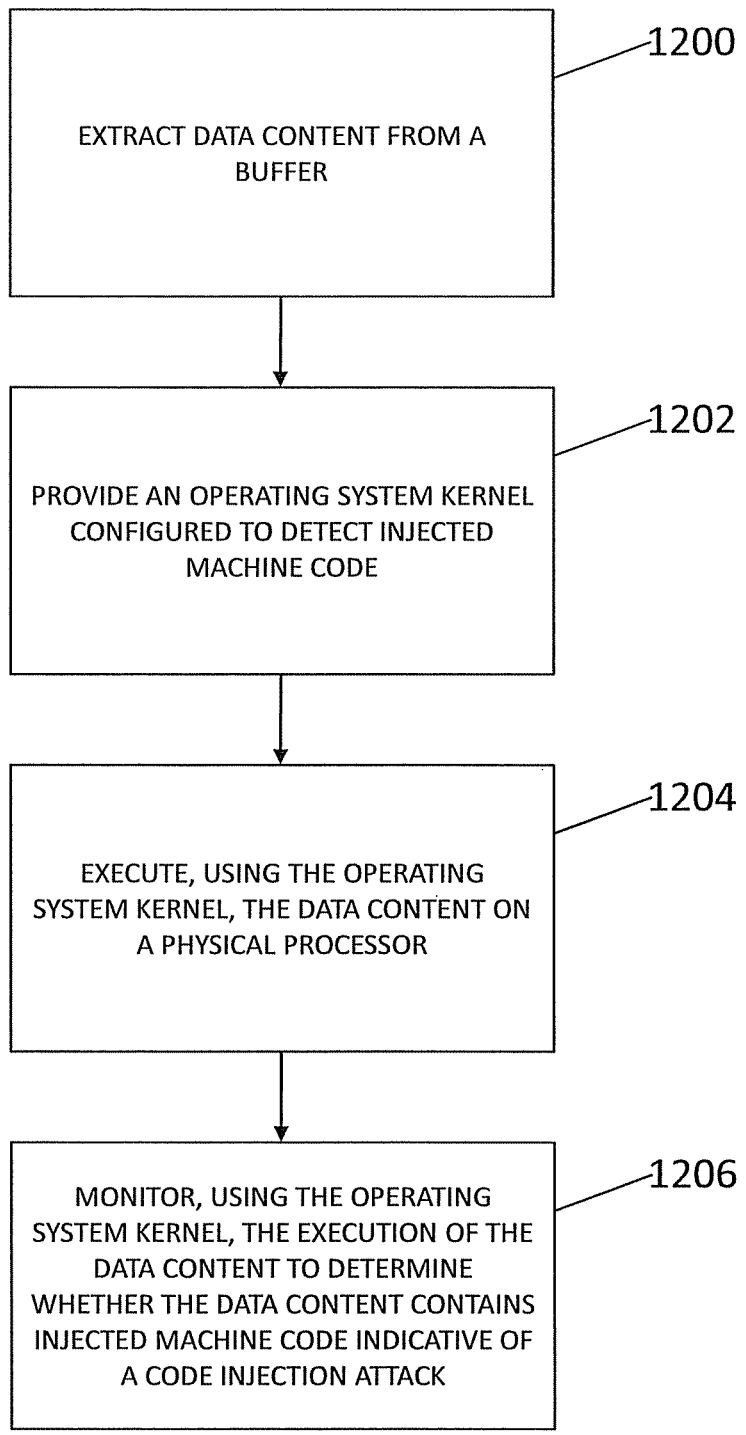
FIG. 12 is a flow chart illustrating a process for detecting injected machine code in accordance with embodiments of the subject matter described herein.

FIG. 12 is a flow chart illustrating a process for detecting injected machine code in accordance with embodiments of the subject matter described herein. Referring to FIG. 12, in step 1200, data content is extracted from a buffer. For example, data content suspected to contain injected machine code may be extracted from buffer 206. In step 1202, an operating system kernel configured to detect injected machine code is provided. For example, an operating system similar to ShellOS 204 may be provided. In step 1204, the operating system kernel is used to execute the data content on a physical processor. For example, ShellOS 204 may be used to execute the data content extracted from buffer 206 on a physical processor. In step 1206, the operating system kernel is used to monitor the execution of the data content to determine whether the data content contains injected machine code indicative of a code injection attack. For example, ShellOS 204 may be used to monitor the execution of the data content extracted from buffer 206 to determine whether the data content contains injected machine code indicative of a code injection attack.

Code injection attack detection based on run-time analysis, whether emulated or supported through direct CPU execution, generally operates as a self-sufficient blackbox wherein a suspicious buffer of code or data is supplied, and a result returned. ShellOS attempts to provide a run-time environment as similar as possible to that which the injected code expects. That said, one can not ignore the fact that shellcode designed to execute under very specific conditions may not operate as expected (e.g., non-self-contained [15, 22], context-keyed [9], and swarm attacks [3]). It is noted, however, that by requiring more specific processor state, the attack exposure is reduced, which is usually counter to the desired goal—that is, exploiting as many systems as possible. The same rational holds for the use of ROP-based attacks, which require specific data being present in memory.

One specific limitation of the instant framework is its current employment of a simplistic approach for loop detection. Whereas software-based emulators are able to quickly detect and (safely) exit an infinite loop by inspecting program state at each instruction, the instant platform only has the opportunity to inspect state at each clock tick. At present, the overhead associated with increasing timer frequency to inspect program state more often limits the ability to exit from infinite loops more quickly. Future work, may explore alternative methods for safely pruning such loops, without incurring excessive overhead.

Finally, ShellOS provides a framework for fast detection and analysis of a buffer, but an analyst or automated data pre-processor (such as that presented in above) must provide these buffers. As experience has shown, doing so can be non-trivial, as special attention must be taken to ensure a realistic operating environment is provided to illicit the proper execution of the sample under inspection. This same challenge holds for other VM or emulation-based detection approaches (e.g., [4, 6, 8, 26]). The instant framework can be extended to benefit from the active body of research in this area.

In summary, a new framework for enabling fast and accurate detection of code injection attacks has been proposed. Specifically, the framework takes advantage of hardware virtualization to allow for efficient and accurate inspection of buffers by directly executing instruction sequences on the CPU. The approach allows for the modular use of existing run-time heuristics in a manner that does not require tracing every machine-level instruction, or performing unsafe optimizations. In doing so, the approach provides a foundation that existing defenses for code injection attacks can take advantage of. The strengths of the framework have been aptly demonstrated by an empirical evaluation spanning real-world attacks.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

REFERENCES

The references listed below, as well as all references cited in the specification, including patents, patent applications, journal articles, and all database entries, are incorporated herein by reference to the extent that they supplement, explain, provide a background for, or teach methodology, techniques, and/or compositions employed herein.

[1] E. Buchanan, R. Roemer, H. Shacham, and S. Savage. When Good Instructions Go Bad: Generalizing Return-Oriented Programming to RISC. In ACM Conference on Computer and Communications Security, October 2008.

[2] B. Z. Charles Curtsigner, Benjamin Livshits and C. Seifert. Zozzle: Low-overhead Mostly Static Javascript Malware Detection. Microsoft Technical Report (MSR-TR-2010-156), November 2010.

[3] S. P. Chung and A. K. Mok. Swarm attacks against network-level emulation/analysis. In International symposium on Recent Advances in Intrusion Detection, pages 175-190, 2008.

[4] M. Cova, C. Kruegel, and V. Giovanni. Detection and analysis of drive-by-download attacks and malicious javascript code. In International conference on World Wide Web, pages 281-290, 2010.

[5] Y. Ding, T. Wei, T. Wang, Z. Liang, and W. Zou. Heap Taichi: Exploiting Memory Allocation Granularity in Heap-Spraying Attacks. In Annual Computer Security Applications Conference, pages 327-336, 2010.

[6] M. Egele, P. Wurzinger, C. Kruegel, and E. Kirda. Defending browsers against drive-by downloads: Mitigating heap-spraying code injection attacks. In Detection of Intrusions and Malware & Vulnerability Assessment, June 2009.

[7] P. Fogla, M. Sharif, R. Perdisci, O. Kolesnikov, and W. Lee. Polymorphic blending attacks. In USENIX Security Symposium, pages 241-256, 2006.

[8] S. Ford, M. Cova, C. Kruegel, and G. Vigna. Analyzing and detecting malicious flash advertisements. In Computer Security Applications Conference, pages 363-372, 2009.

[9] D. A. Glynos. Context-keyed Payload Encoding: Fighting the Next Generation of IDS. In Athens IT Security Conference (ATH.CON), 2010.

[10] R. Goldberg. Survey of Virtual Machine Research. IEEE Computer Magazine, 7(6):34-35, 1974.

[11] B. Cu, X. Bai, Z. Yang, A. C. Champion, and D. Xuan. Malicious shellcode detection with virtual memory snapshots. In International Conference on Computer Communications (INFOCOM), pages 974-982, 2010.

[12] I. Kim, K. Kang, Y. Choi, D. Kim, J. Oh, and K. Han. A Practical Approach for Detecting Executable Codes in Network Traffic. In Asia-Pacific Network Ops. & Mngt Symposium, 2007.

[13] G. MacManus and M. Sutton. Punk Ode: Hiding Shellcode in Plain Sight. In Black Hat USA, 2006.

[14] L. Martignoni, R. Paleari, G. F. Roglia, and D. Bruschi. Testing CPU Emulators. In International Symposium on Software Testing and Analysis, pages 261-272, 2009.

[15] J. Mason, S. Small, F. Monrose, and G. MacManus. English shellcode. In Conference on Computer and Communications Security, pages 524-533, 2009.

[16] J. McHugh. Testing Intrusion Detection Systems: A Critique of the 1998 DARPA Intrusion Detection System Evaluations as Performed by Lincoln Laboratory. ACM Transactions on Information and Systems Security, 3(4), 2000.

[17] R. Paleari, L. Martignoni, G. F. Roglia, and D. Bruschi. A Fistful of Red-Pills: How to Automatically Generate Procedures to Detect CPU Emulators. In USENIX Workshop on Offensive Technologies, 2009.

[18] A. Pasupulati, J. Coit, K. Levitt, S. F. Wu, S. H. Li, R. C. Kuo, and K. P. Fan. Buttercup: on Networkbased Detection of Polymorphic Buffer Overflow Vulnerabilities. In IEEE/IFIP Network Op. & Mngt Symposium; pages 235-248, May 2004.

[19] U. Payer, P. Teufl, and M. Lamberger. Hybrid Engine for Polymorphic Shellcode Detection. In Detection of Intrusions and Malware & Vulnerability Assessment, pages 19-31, 2005.

[20] J. D. Pincus and B. Baker. Beyond stack Smashing: Recent Advances in Exploiting Buffer Overruns. IEEE Security and Privacy, 4(2):20-27, 2004.

[21] M. Polychronakis, K. G. Anagnostakis, and E. P. Markatos. Network-level Polymorphic Shellcode Detection using Emulation. In Detection of Intrusions and Malware & Vulnerability Assessment, pages 54-73, 2006.

[22] M. Polychronakis, K. G. Anagnostakis, and E. P. Markatos. Emulation-based Detection of Non-selfcontained Polymorphic Shellcode. In International Symposium on Recent Advances in Intrusion Detection, 2007.

[23] M. Polychronakis, K. G. Anagnostakis, and E. P. Markatos. An Empirical Study of Real-world Polymorphic Code Injection Attacks. In USENIX Workshop on Large-Scale Exploits and Emergent Threats, 2009.

[24] M. Polychronakis, K. G. Anagnostakis, and E. P. Markatos. Comprehensive shellcode detection using runtime heuristics. In Annual Computer Security Applications Conference, pages 287-296, 2010.

[25] P. V. Prahbu, Y. Song, and S. J. Stolfo. Smashing the Stack with Hydra: The Many Heads of Advanced Polymorphic Shellcode, 2009. Presented at Defcon 17, Las Vegas.

[26] N. Provos, D. McNamee, P. Mavrommatis, K. Wang, and N. Modadugu. The ghost in the browser: Analysis of web-based malware. In Usenix Workshop on Hot Topics in Botnets, 2007.

[27] N. Provos, P. Mavrommatis, M. A. Rajab, and F. Monrose. All Your iFRAMEs Point to Us. In USENIX Security Symposium, pages 1-15, 2008.

[28] T. Raffetseder, C. Kruegel, and E. Kirda. Detecting System Emulators. Information Security, 4779:1-18, 2007.

[29] P. Ratanaworabhan, B. Livshits, and B. Zorn. NOZZLE: A Defense Against Heap-spraying Code Injection Attacks. In USENIX Security Symposium, pages 169-186, 2009.
[30] A. Sotirov and M. Dowd. Bypassing Browser Memory Protections. In Black Hat USA, 2008.
[31] T. Toth and C. Kruegel. Accurate Buffer Overflow Detection via Abstract Payload Execution. In International Symposium on Recent Advances in Intrusion Detection, pages 274-291, 2002.
[32] X. Wang, Y.-C. Jhi, S. Zhu, and P. Liu. STILL: Exploit Code Detection via Static Taint and Initialization Analyses. Annual Computer Security Applications Conference, pages 289-298, December 2008.
[33] Y. Younan, P. Philippaerts, F. Piessens, W. Joosen, S. Lachmund, and T. Walter. Filter-resistant code injection on arm. In ACM Conference on Computer and Communications Security, pages 11-20, 2009.
[34] Q. Zhang, D. S. Reeves, P. Ning, and S. P. Iyer. Analyzing Network Traffic to Detect Self-Decrypting Exploit Code. In ACM Symposium on Information, Computer and Communications Security, 2007.

What is claimed is:

1. A method for detecting injected machine code, the method comprising:
   extracting data content from a buffer;
   providing an operating system kernel configured to detect injected machine code;
   executing, using the operating system kernel, the data content on a physical processor;
   monitoring, using the operating system kernel, the execution of the data content to determine whether the data content contains injected machine code indicative of a code injection attack; and
   generating output specifying at least one of whether injected machine code was detected, a location in the buffer where injected machine code was detected, and a log of actions performed by detected injected machine code.

2. The method of claim 1 wherein the buffer is associated with at least one of a heap object, a network stream, a user file, and a multimedia platform object.

3. The method of claim 1 wherein executing the data content includes initiating execution from different offsets in the buffer.

4. The method of claim 1 wherein executing the data content includes utilizing hardware virtualization.

5. The method of claim 4 wherein the hardware virtualization mediates processor events that cause a change in system state and allows guest instruction execution to occur directly on the processor.

6. The method of claim 1 wherein monitoring the execution of the data content includes tracing specific memory reads, writes, and executions via hardware-supported paging mechanisms.

7. The method of claim 1 wherein monitoring the execution of the data content includes flagging execution chains that do not cause execution faults.

8. The method of claim 1 wherein the operating system kernel is optimized for detecting injected machine code.

9. The method of claim 8 wherein the operating system kernel is configured to implement an arbitrary, operator defined, analysis heuristic for determining whether the instructions contain injected machine code indicative of a code injection attack.

10. The method of claim 9 wherein the analysis heuristic traces memory accesses to specific predefined locations.

11. The method of claim 1 comprising taking a snapshot of memory contents of processes at the time the buffer is created.

12. A system for detecting injected machine code, the system comprising:
    an operating system kernel configured to detect injected machine code, wherein the operating system kernel includes:
      a buffer execution module configured to extract data content from a buffer and execute, using the operating system kernel, the data content on a physical processor;
      an injected machine code analysis module configured to monitor, using the operating system kernel, the execution of the data content to determine whether the data content contains injected machine code indicative of a code injection attack; and
    wherein the injected machine code analysis module is configured to generate output specifying at least one of whether injected machine code was detected, a location in the buffer where injected machine code was detected, and a log of actions performed by detected injected machine code.

13. The system of claim 12 wherein the buffer is associated with at least one of a heap object, a network stream, a user file, and a multimedia platform object.

14. The system of claim 12 wherein the buffer execution module is configured to execute the data content by initiating execution from different offsets in the buffer.

15. The system of claim 12 wherein the buffer execution module is configured to execute the data content utilizing hardware virtualization.

16. The system of claim 15 wherein the hardware virtualization mediates processor events that cause a change in system state and allows guest instruction execution to occur directly on the processor.

17. The system of claim 12 wherein the injected machine code analysis module is configured to monitor the execution of the data content by tracing specific memory reads, writes, and executions via hardware-supported paging mechanisms.

18. The system of claim 12 wherein the injected machine code analysis module is configured to monitor the execution of the data content by flagging execution chains that do not cause execution faults.

19. The system of claim 12 wherein the operating system kernel is optimized for detecting injected machine code.

20. The system of claim 19 wherein the operating system kernel is configured to implement an arbitrary, operator defined, analysis heuristic for determining whether the instructions contain injected machine code indicative of a code injection attack.

21. The system of claim 20 wherein the analysis heuristic traces memory accesses to specific predefined locations.

22. The system of claim 12 wherein the buffer execution module is configured to take a snapshot of memory contents of processes at the time the buffer is created.

23. A non-transitory computer readable medium comprising computer executable instructions that when executed by a processor of a computer control the computer to perform steps comprising:
    extracting data content from a buffer;
    providing an operating system kernel configured to detect injected machine code;
    executing, using the operating system kernel, the data content on a physical processor; and monitoring, using the operating system kernel, the execution of the data content to determine whether the data content contains injected machine code indicative of a code injection attack; and generating output specifying at least one of whether injected machine code was detected, a location in the buffer where injected machine code was detected, and a log of actions performed by detected injected machine code.

* * * * *